(12) United States Patent
Griessl et al.

(10) Patent No.: US 6,370,196 B1
(45) Date of Patent: Apr. 9, 2002

(54) METHOD AND APPARATUS FOR MULTIRESOLUTION OBJECT-ORIENTED MOTION ESTIMATION

(75) Inventors: Max Griessl, München (DE); Harald Skt. Martens, Copenhagen (DK); Jan Otto Reberg, Langhus (NO); Clemens Röttgermann, München (DE); Markus Wittkop, Ismaning (DE); Siegfried Wonneberger, München (DE)

(73) Assignee: IDT International Digital Technologies Deutschland GmbH, Ismaning (DE)

( * ) Notice: Subject to any disclaimer, the term of this patent is extended or adjusted under 35 U.S.C. 154(b) by 0 days.

(21) Appl. No.: 09/463,787
(22) PCT Filed: May 20, 1998
(86) PCT No.: PCT/EP98/02951
§ 371 Date: Mar. 27, 2000
§ 102(e) Date: Mar. 27, 2000
(87) PCT Pub. No.: WO99/07156
PCT Pub. Date: Feb. 11, 1999

(30) Foreign Application Priority Data

Jul. 28, 1997 (EP) ............................................. 97112974

(51) Int. Cl.$^7$ ................................................ H04N 7/12
(52) U.S. Cl. ................................................ 375/240.16
(58) Field of Search .................... 375/240.16, 240.08, 375/240.09, 240.17; 348/416.1, 699; 382/236, 238, 240, 243; 386/109, 111; 358/261.2, 430

(56) References Cited

U.S. PATENT DOCUMENTS

| | | | | |
|---|---|---|---|---|
| 5,276,513 A | * | 1/1994 | van der Wal et al. | 348/699 |
| 5,594,504 A | * | 1/1997 | Ebrahimi | 348/416 |
| 5,608,458 A | * | 3/1997 | Chen et al. | 348/413 |
| 5,901,248 A | * | 5/1999 | Fandrianto et al. | 382/236 |
| 5,936,671 A | * | 8/1999 | Beek et al. | 348/413 |
| 5,987,178 A | * | 11/1999 | Anesko et al. | 382/236 |

FOREIGN PATENT DOCUMENTS

| | | | | |
|---|---|---|---|---|
| EP | 0 466 981 A1 | 7/1990 | | G06F/15/70 |
| EP | 0 460 997 A1 | 5/1991 | | G06F/15/70 |
| FR | 2 700 654 A1 | 1/1993 | | H04N/15/00 |
| WO | WO 93/07585 | 4/1993 | | G06K/9/40 |
| WO | WO 95/26539 | 10/1995 | | G06T/7/20 |
| WO | WO 96/23279 | 8/1996 | | G06T/7/20 |

* cited by examiner

Primary Examiner—Vu Le

(57) ABSTRACT

A method for estimating a motion field from a first image with a corresponding first shape to a second image with a corresponding second shape, wherein a hypothesis motion field is given and the motion fields have one motion vector for each valid pixel or valid block of pixels in the first image.

33 Claims, 13 Drawing Sheets

METHOD AND APPARATUS FOR MULTIRESOLUTION OBJECT-ORIENTED MOTION ESTIMATION

RELATED APPLICATION

The application is related to the following applications assigned to the same applicant as the present invention and filed on even date herewith, the disclosures of which are hereby incorporated by reference:

Method and apparatus for compressing video sequences (Our file: IDT 018 WO). Method and apparatus for compression of video images and image residuals (Our file: IDT 018 WO).

FIELD OF INVENTION

This patent deals with the field of motion estimation in sequences of two-dimensional images with arbitrary shapes over several frames where no restriction on the type of image data is given. Image sequences can be acquired for instance by video, X-ray, infrared, radar cameras or by synthetic generation etc.

BACKGROUND OF INVENTION

Motion estimation is a highly under-determined problem, therefore additional constraints are necessary in order to get a unique solution for the corresponding system of equations. In many approaches isotropic or anisotropic spatial smoothing terms are used for this purpose. But this is still not sufficient to get satisfying results for real sequences. For tracking motion over several frames, detecting motion vectors with high amplitudes, overcoming the "aperture problem" and aliasing effects in time, stabilizing the motion estimation against outliers and noise and getting high correlated motion estimates in time and space enhanced prediction and filtering methods have to be applied. Although a lot of work has been done in the framework of estimating dense motion fields, a conclusive, detailed treatment of arbitrary shaped images is hardly described, especially for hierarchical motion estimation systems. For general reference see the following reference list:

1. Joachim Dengler. Local motion estimation with the dynamic pyramid. Pyramidal Systems for Computer Vision, F25:289–297, 1986. Comment: Presentation of a pyramidal approach.
2. Enkelmann. Investigations of multigrid algorithms for the estimation of optical flow fields in image sequences. Computer Vision, Graphics and Image Processing, 43:150–177, March 1988. Comment: Applying multigrid methods for solving estimating optical flow fields by using orientated smoothness constraints.
3. Sugata Ghosal and Petr Vanok. A fast scalable algorithm for discontinuous optical flow estimation. IEEE Transactions on Pattern Analysis and Machine Intelligence, 18(2), February 1996, Comment: Multigrid approach for solving the motion estimation problem by using anisotropic smoothness constraints.
4. Gonzalez and R. E. Wood. Digital Image Processing. Addison Wesley, 1992. Comment: General image processing book.
5. Sheila S. Hemami Gregory U. Conklin. Multi-resolution motion estimation. In IEEE ICASSP München, pages 2873–2876, 1997. Comment: Coarse to fine propagation versus fine to coarse propagation.
6. B. K. P Horn and B. G. Schunck. Determining optical flow. Artificial Intelligence, 17:185–203, 1981. Comment: Basic article for gradient based approaches.
7. Bernd Jaehne. Digitale Bildverarbeitung. Springer-Verlag, 1993. Comment: General book about image processing. General description of pyramidal approaches.
8. P. Anandan; J. R. Bergen and K. J. Hanna. Hierarchial model-based motion estimation. In Reginald L. Lagendijk M. Ibrahim Sezan, editor, Motion Analysis and Image Sequence Processing. Kluwer Academic Publishers, 1993. Comment: Introduction to the advantage of using pyramidal approaches for determining optical flow.
9. Hans-Helmut Nagel. Image sequences—ten (octal) years—from phenomenology towards a theoretical foundation. IEEE, pages 1174–1185, 1986. Comment: Overview article.
10. P. Anandan. A unified perspective on computational techniques for the measurement of visual motion. IEEE, Conference on Computer Vision, pages 219–230, 1987. Comment: Overview of the problems and possibilities of pyramidal approaches for motion estimation.
11. Adelson P. J. Burt. The laplacian pyramid as a compact image code. IEEE Trans. Communications, 31:532–540, 1983. Comment: Introduction to pyramids.
12. Singh. Optic Flow Computation, A Unified Perspective. IEEE Computer Society Press Monograph, 1991. Comment: General introduction and presentation of a framework for motion estimation.
13. T. Lin and J. L. Barron. Image reconstruction error for optical flow. from Internet, 1996. Comment: Comparison of different motion estimators.
14. Woods and J. Kim. Motion compensated spatial temporal kalman filter. In Reginald L. Lagendijk M. Ibrahim Sezan, editor, Motion Analysis and Image Sequence Processing. Kluwer Academic Publishers, 1993. Comment: Noise reduction in image sequences by using the time correlation between images. The method is a combination of motion compensation and spatial temporal Kalman filtering.
15. B. Chupeau, M. Pecot. Method for hierarchical estimation of the movement in asequence of images, U.S. Pat. No. 5,278,915, issued Jan. 11, 1994, Thomson-CSF, Puteaux, France.
16. V. Markandey. System and method for determining optical flow, U.S. Pat. No. 5,680,487, issued Oct. 21, 1997, Texas Instruments Incorporated, Dallas, Tex.

Objects of Invention

It is an object of this invention to provide mechanisms for improving motion estimation between arbitrary shaped images where large displacement amplitudes may occur. The improvements concern for example the quality of images predicted from the motion fields (i.e. a reduction of the displaced frame differences) and the temporal and spatial correlation of the motion fields performing motion estimation within a set of subsequent images. The improvement of temporal and spatial correlation can be useful in image analysis and compression of motion fields.

It is an object of the invention to provide hierarchical systems which are able to estimate dense motion fields between arbitrary shaped images. The explicit treatment of the shapes as described in the present invention allows a natural consideration of invalid pixels which may occur during the estimation process.

It is an object of the invention to provide methods which are applicable in motion estimation schemes where an image is predicted by forward warping as well as for motion estimation schemes where an image is predicted by backward warping.

It is a further object of the present invention to provide a technique for motion estimation in a sequence of related images. The images can be related in any way, for instance temporal or spatial (i.e. in subsequent resolutions).

It is a further object of this invention to provide tracking of motion for several frames where large displacement amplitudes may occur.

It is a further object of this invention to provide a technique for combining motion fields achieved by different estimations.

It is a further object of this invention to provide a technique for propagating information in a subsequent estimation process.

It is a further object of this invention to provide a technique for a local adaptive filtering of motion fields in order to achieve a gain in quality.

It is a further object of this invention to provide a technique for using motion fields from former estimations as hypotheses for the following estimation.

Notations and Definitions $D_v$: Vertical component of the motion field.
$D_h$: Horizontal component of the motion field.
D: All components of the displacement field, i.e. the motion field.
$D:=(D_v, D_h)$ for two dimensions.
$H_v$: Vertical component of a hypothesis for the motion field.
$H_h$: Horizontal component of a hypothesis for the motion field.
H: All components of the hypothesis for the motion field.
$H:=(H_v, H_h)$ for two dimensions.
$I_D$: Image in the coordinate system of the motion field D.
$S_D$: Shape field in the coordinate system of the motion field D. It is a validity field which defines the valid pixels for all fields in the position (coordinate system) of D.
$I_T$: Image in target position, i.e. the image "to" which the motion field points.
$S_T$: Shape field in target position. It is a validity field which defines the valid pixels for all fields in the target position.
$\hat{X}$: A field X which is created by forward warping, i.e. forward motion compensation, as for example described in Method and apparatus for compressing video sequences, already included by reference.
$\tilde{X}$: A field X which is created by backward warping, i.e. backward motion compensation, as for example described in Method and apparatus for compressing video sequences, already included by reference.
$S_{Prop}$: A validity field which defines pixels to be propagated.
$X^k$: A field or value X on pyramid level k. In general pyramid level indices are written at superscript and the counting starts with the finest resolution level k=0,1,2, . . . If all fields are defined on the same pyramid level the superscript k is omitted. With the term 'Block of pixels' an arbitrary shaped group of pixels is described, too.

The subscripts $(_{D,T})$ do only define in which coordinate system the motion field is defined. The image to be predicted may be the image in target position ($I_T$) for a forward warping scheme or the image in the coordinate system of the motion field ($I_D$) for a backward warping scheme. In both cases the motion field is estimated from the image $I_D$ with the corresponding shape $S_D$ to the image $I_T$ with the corresponding shape $S_T$.

Images without shapes can be described as shaped images where the shapes consist merely of valid pixels.

SUMMARY OF THE INVENTION

The invention is based on a hierarchical motion estimation system which provides motion estimation between arbitrary shaped images. Relations between the images and their shapes are used to stabilize the motion estimation, detect large displacements and to track motion over several frames in a recursive scheme. Due to the fact that the shape information can be used to distinguish either between inside and outside a video object or between valid or invalid motion vectors, the shape field flow within the pyramidal motion estimation can take both features into consideration.

The present invention is applicable for estimating motion fields which are used for forward compensation as well as for estimating motion fields which are used for backward compensation.

According to one of its embodiments the present invention uses a propagation strength for the propagation of data from former estimation steps in order to avoid propagation of data with low confidence.

The present invention further according to one of its embodiments employs to set propagation strength according to the shapes, the image intensity gradients and confidence measurements.

According to one of its embodiments the present invention comprises a methods and/or an apparatus to use motion fields as hypothesis for motion estimation and allow motion estimation between a reference frame and frames which are related with the reference frame by motion data with large amplitudes. The methods are not restricted to certain basic motion estimation methods, for instance gradient based methods, matching methods, phase correlation and Markov random field approaches. Due to the restrictions of these basic motion estimation methods, higher level motion estimation methods are required in many applications.

According to one of its embodiments the present invention employs the combination of preliminary motion fields to a final field. The preliminary motion fields are achieved from former estimations and temporal extrapolations of them and/or from estimations in different resolutions within a pyramidal system. The combination is performed by selecting those motion vectors from the set of preliminary motion fields which yield the best local predictions. The selection is stored in a so called choice field. Various enhancements to this basic approach are presented: The choice field is filtered using a median filter. The choice field is altered in order to minimize the number of bits to represent the final field. Masking effects of the human visual system are considered. Furthermore the usage of different color channels is described.

According to one of its embodiment the present invention applies local adaptive filtering in order to provide data dependent spatial inhomogeneous filtering of motion fields. Image gradient fields, motion gradient fields, confidence measurement fields or system dependent requirements can be used to set the filter masks.

According to one of its embodiments the present invention sets filter masks for local adaptive filtering of motion fields.

According to one of its embodiments the present invention comprises an hierarchical motion estimation apparatus which uses different combinations of the methods according to the embodiments of the invention.

According to one of its embodiments the present invention comprises an hierarchical motion estimation apparatus which performs motion estimation in a subsequent set of shaped images and uses motion fields from former estimations as hypothesis.

The aforementioned features also may be combined in an arbitrary manner to form another particular embodiment of the invention.

FIRST PREFERRED EMBODIMENT

Figure 1:
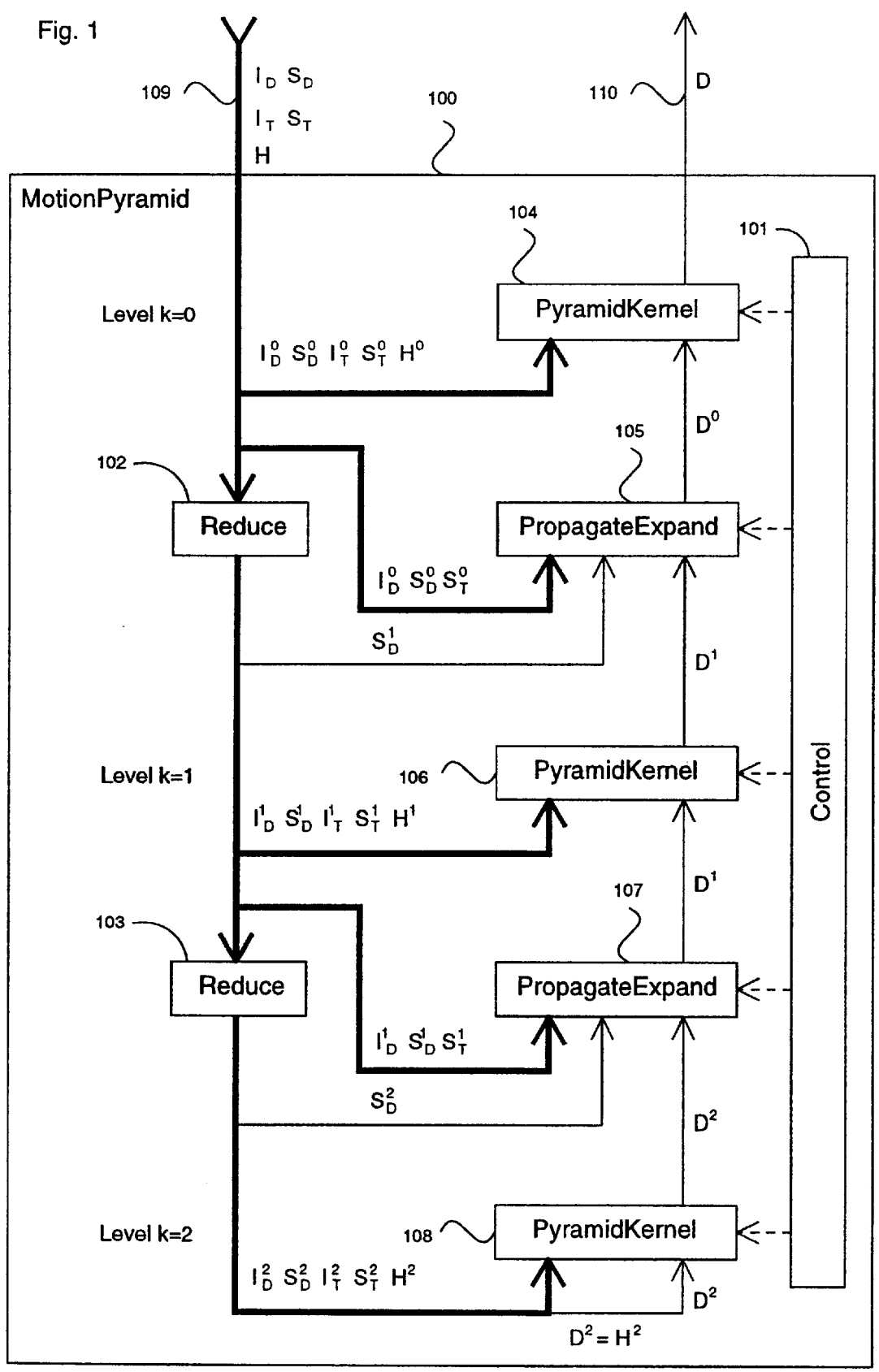
FIG. 1: First preferred embodiment: Overview of a hierarchical motion estimation system, referenced as module MotionPyramid.

FIG. 1 shows the invention in a first preferred embodiment. It is a hierarchical motion estimation system (100) with different resolution levels, i.e. a Gaussian pyramid (Burt and Adelson). A pyramidal approach is chosen for the common reasons (Anandan):

1. Motion with high amplitude can be detected.
2. The motion estimation is under-determined which leads to the aperture problem and aliasing problems in time. These problems can be reduced by using a multi resolution approach.
3. In low frequency areas the convergence time of motion estimation methods increases. On the other hand in such areas the motion estimation can be done on coarser resolutions levels. Hence a pyramidal approach leads to higher computational efficiency.

In the following the motion estimation system (100) will be referenced as module MotionPyramid. The module MotionPyramid (100) receives as input (109) an image $I_D$, a shape $S_D$, an image $I_T$ in target position, a corresponding shape $S_T$ and a hypothesis H for the motion field D. The output (110) of the module MotionPyramid (100) is the estimated motion field D. The module MotionPyramid (100) consists of the following modules:

1. Control (101): Controls all parameters and the communication between the modules.
2. Reduce (102)(103): Filter and subsample modules.
3. PyramidKernel (104)(106)(108): Main estimation modules.
4. PropagateExpand (105)(107): Propagation and expand modules.

Initially the input fields (109) are reduced by the module Reduce (102) and the module Reduce (103) until the coarsest resolution level is reached. In general the number of pyramid levels is variable. In this described example (FIG. 1) three pyramid levels (labeled by 0,1,2) are shown. At the coarsest level the motion field D is initialized with the values of the hypothesis H. At resolution level k=2 the module PyramidKernel module (108) is applied in order to estimate the motion field D for the coarsest level. This motion field is propagated and expanded by the PropagateExpand module (107) to the next finer resolution level. The process is repeated on level k=1 by applying module (106) and (105). On the finest resolution level k=0 only the PyramidKernel (104) is applied. The whole process is controlled by the Control module (101). The functionality of the Reduce modules (102) and (103), in general on all pyramid levels, may be identical. Also the functionality of the PyramidKernel modules (104), (106) and (108), in general on all pyramid levels, may be identical. Also the functionality of the PropagateExpand modules (105) and (107), in general on all pyramid levels, may be identical. The number of pyramid levels may depend on the image size, the content of the shapes and the maximal expected displacement.

The modules Reduce (102) and (103) apply a typical reduce operation of a Gaussian pyramid (Burt and Adelson) on all input data of the pyramid with respect to their shape information. The different types of fields may be treated differently. In order to avoid aliasing, the data are low pass filtered and sub-sampled. The motion field amplitudes are divided by 2 in order to scale the change of address according to the new resolution.

Figure 2:
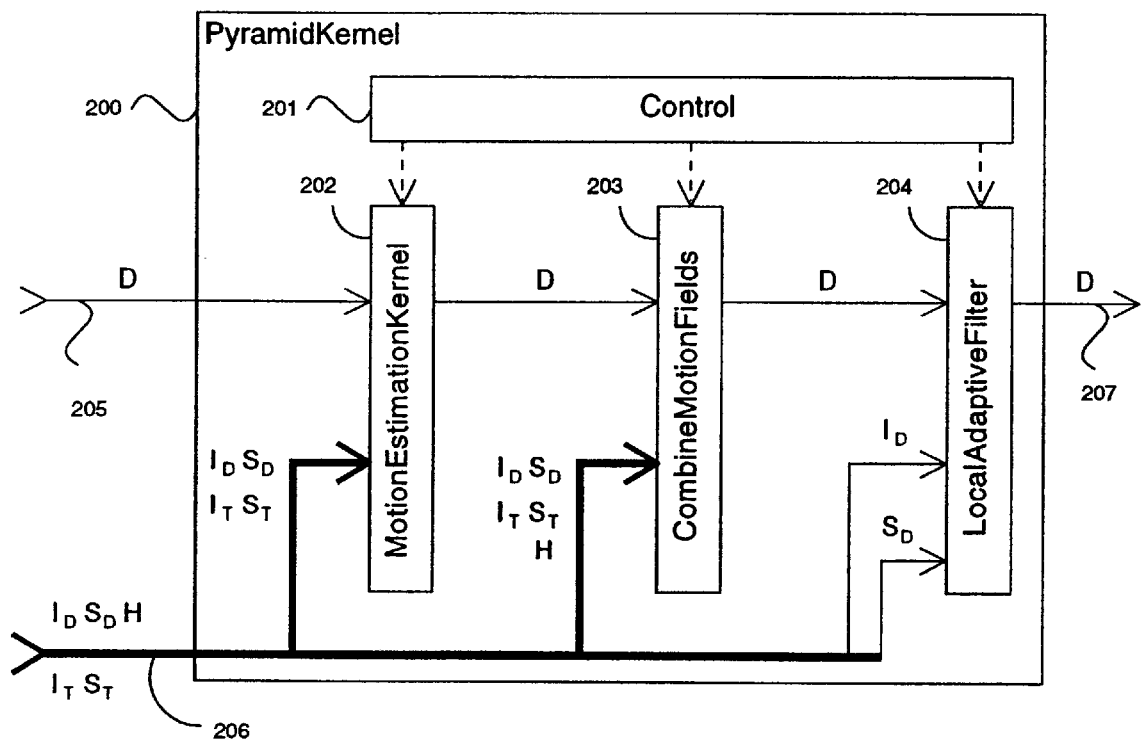
FIG. 2: Main motion estimation module applied on each pyramid level, referenced as module PyramidKernel.

The modules PyramidKernel (104), (106) and (108) will now be described with reference to FIG. 2. PyramidKernel (200) receives as input (206) an image $I_D$, a shape $S_D$, an image $I_T$ in target position, a corresponding shape $S_T$, the hypothesis and the preliminary motion field D (205). The output (207) is the final estimated motion field D. PyramidKernel (200) consists of the following modules:

1. Control (201): Controls the parameters for all modules.
2. MotionEstimationKernel (202): Calls a basic motion estimation module in addition to preprocessing and post processing.
3. CombineMotionFields (203): Combines the output of the MotionEstimationKernel (202) and the hypothesis for the motion field in order to stabilize the estimation against outliers.
4. LocalAdaptiveFilter (204): Provides local adaptive filtering of the motion field with respect to the image content. The filter allows extensive filtering of the motion field in low confidence areas without disturbing edges occurring for instance in occlusion and innovation areas.

The module MotionEstimationKernel (202) provides a first estimate of the motion field. This estimate is combined with the hypothesis by the module CombineMotionFields (203) in order to stabilize the estimate. The output is filtered by the module LocalAdaptiveFilter (204). The LocalAdaptiveFilter (204) provides the final estimate of the motion field respecting edges in the image $I_D$.

Figure 3:
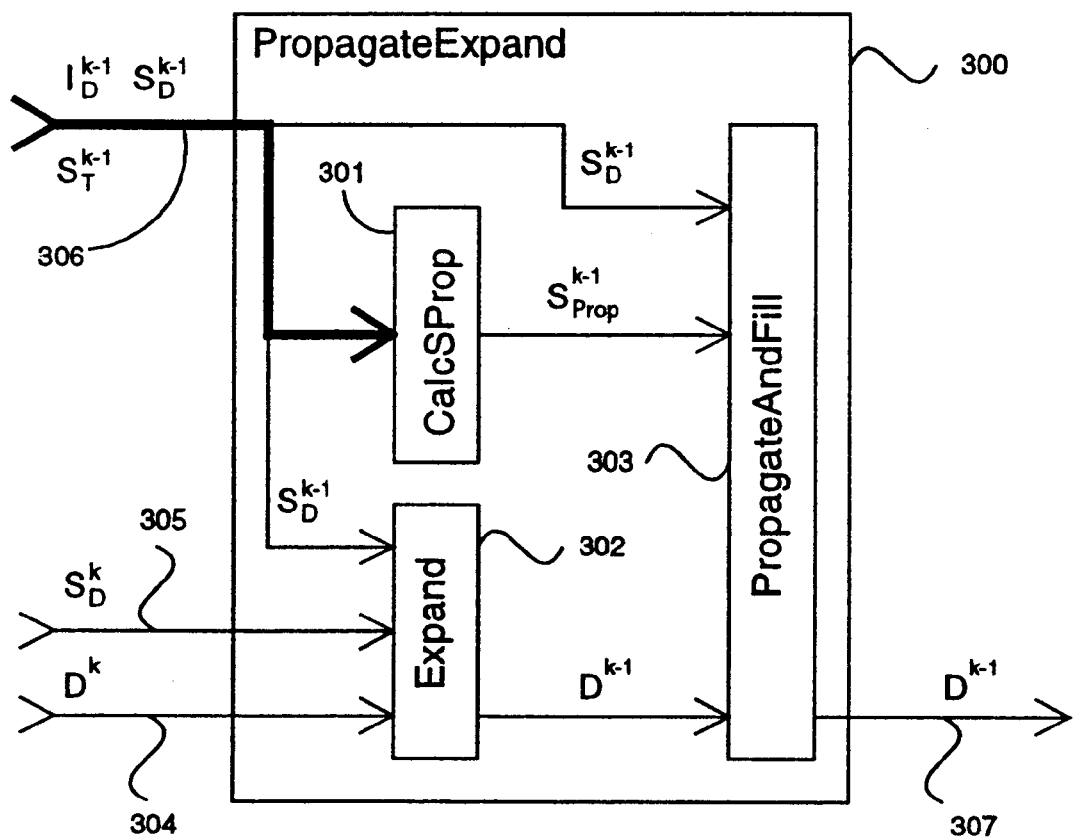
FIG. 3: Main propagation module from a coarse to the next finer resolution level in the pyramid, referenced as module PropagateExpand.

The modules PropagateExpand (105) and (107) will now be described with reference to FIG. 3. PropagateExpand (300) allows to exclude motion vectors with low confidence from the propagation and to provide a hypothesis with discontinuities on high frequency areas of the image for the next level. As input this module (300) receives the motion field $D^k$ (304) and the corresponding shape $S_D^k$ (305) from the coarse resolution level. Furthermore this module receives (306) the image $I_D^{k-1}$, the corresponding shape $S_D^{k-1}$ and the shape $S_T^{k-1}$ in target position from the finer resolution level k−1. The output (307) is the motion field $D^{k-1}$ on the finer resolution level. PropagateExpand (300) consists of the following modules:

1. CalcSProp (301): Calculates the validity field $S_{Prop}$ which defines the pixels to be propagated from one pyramid level to the next finer level.
2. Expand (302): Expands the motion field D from pyramid level k to k−1 with respect to the shape fields $S_D^k$, $S_D^{k-1}$. The expand operation is a common expand operation in a Gaussian pyramid as for example described in (Burt and Adelson). In order to scale the change of address according to the new resolution, the motion field amplitudes are multiplied by 2. In the output all fields are defined on pyramid level k−1.
3. PropogateAndFill (302), The motion field $D^{k-1}$ is cut with $S_{Prop}^{k-1}$. It follows that undefined areas in $D^{k-1}$ may exist. These are filled for instance by extrapolation. In the output motion field $D^{k-1}$ all motion vectors on $S_D^{k-1}$ are defined.

Figure 4:
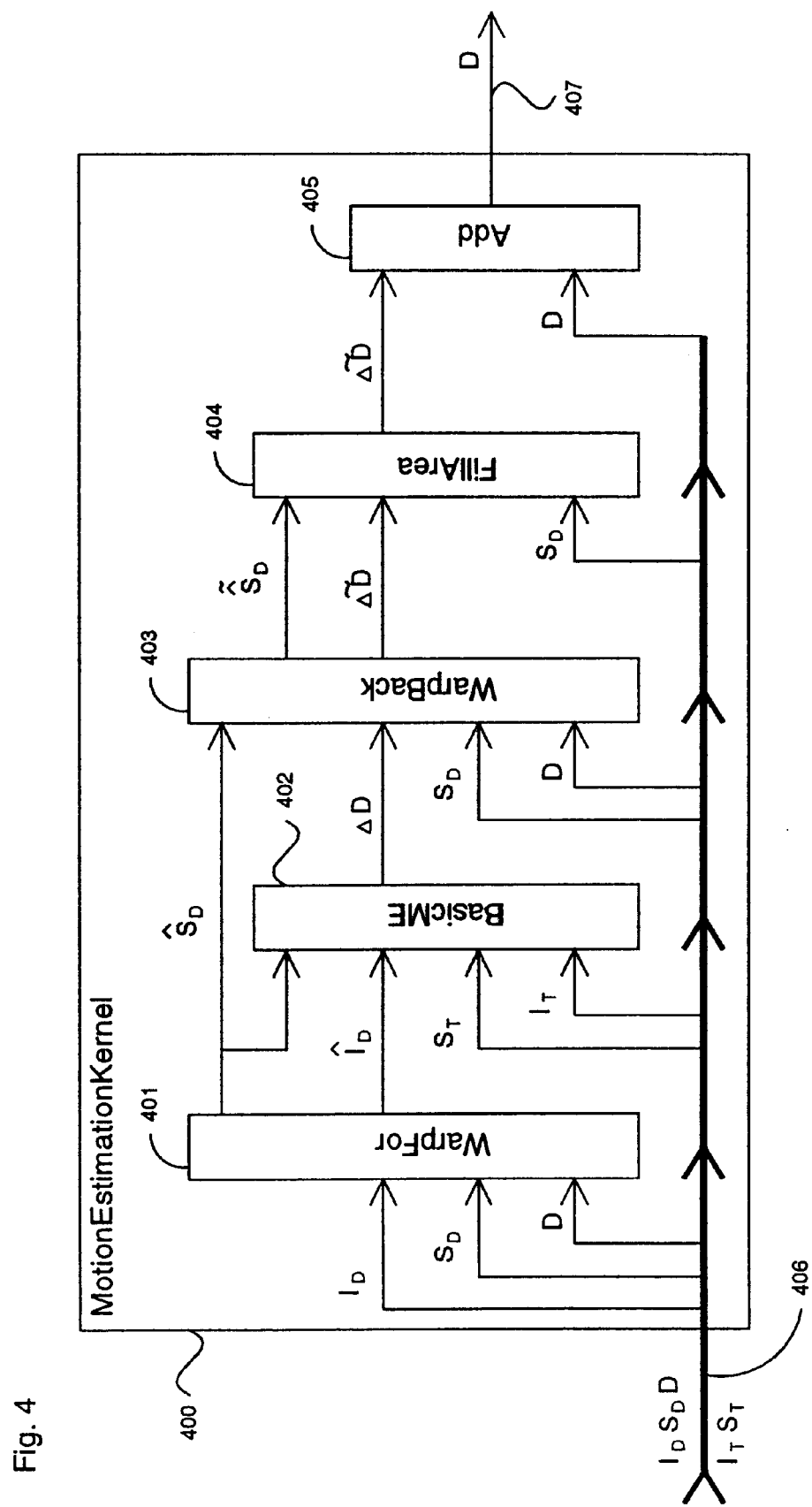
FIG. 4: Motion estimation kernel of the main motion estimation module (PyramidKernel), referenced as module MotionEstimationKernel for a forward compensating scheme.
Figure 5:
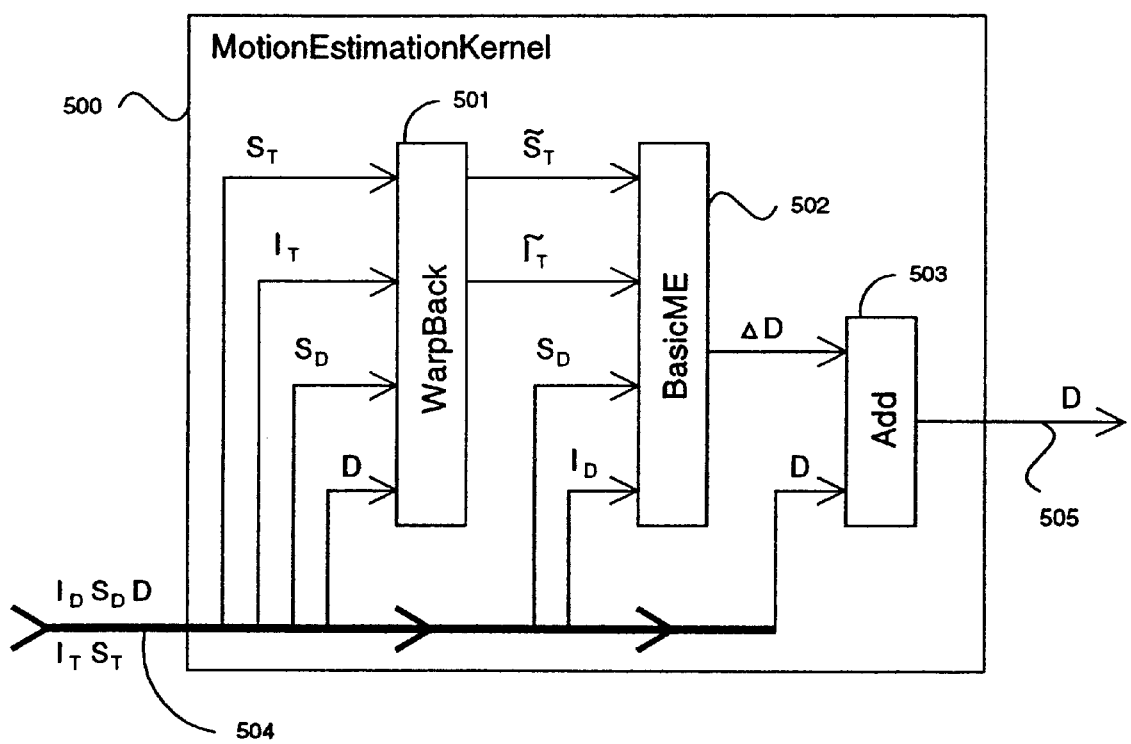
FIG. 5: Motion estimation kernel of the main motion estimation module (PyramidKernel), referenced as module MotionEstimationKernel for a backward compensating scheme.

The module MotionEstimationKernel (202) will now be described with reference to FIG. 4 (for a forward compensation scheme) and FIG. 5 (for a backward compensation scheme). The module (400)(500) receives as input (406) (504) an image $I_D$, a corresponding shape $S_D$, an image $I_T$ in target position, a corresponding shape $S_T$ and a preliminary motion field D. The output (407)(505) is the estimated motion field D. MotionEstimationKernel (400)(500) works different for a forward compensation scheme (400) and for a backward compensation scheme (500). For the forward compensation scheme the module MotionEstimationKernel (400) consists of the following modules:

1. WarpFor (401): Forward warping of $I_D$ and $S_D$ with the motion field D to get predictions $\hat{I}_D$ and $\hat{S}_D$ which are close to $I_T$ and $S_T$ in order to prepare good conditions for the following basic motion estimator.
2. BasicME (402): A basic motion estimation method which does not need to be able to find large displacements or to take a motion field hypothesis as input. It receives as input $\hat{I}_D$, $\hat{S}_D$, $I_T$ and $S_T$. The output is the difference motion field $\Delta D$ which is the estimation of the displacement field from $\hat{I}_D$ to $I_T$. Examples which can be used as BasicME (402) are: gradient based methods as described in (Horn and Schunck), (Ghosal and Vanek) and correlation matching methods (Singh). These lower level motion estimation methods yield reasonable estimates only if certain constraints are satisfied. For example, the images $\hat{I}_D$ and $I_T$ must be strongly correlated due to short displacements and must contain sufficient structure. Moreover these basic motion estimation methods need not be able to take into account a motion hypothesis. The difference motion field $\Delta D$ is defined in the position of $\hat{I}_D$, but the final motion field D is defined in the position of $I_D$ (position of the initial motion field). Hence $\Delta D$ is warped back to the position of the initial motion field by the following module.
3. WarpBack (403): Backward warping of the difference motion field $\Delta D$. It receives the preliminary motion field D, with the corresponding shape $S_D$, and the fields to be warped back: $\hat{S}_D$ and the difference motion field $\Delta D$. The output consists of the fields $\Delta D$ and $\tilde{S}_D$, both warped back by the preliminary motion field D. Due to the warp and warp back operations the shape $\tilde{S}_D$ is a subset of $S_D$ (i.e. $\tilde{S}_D \subseteq S_D$).
4. FillArea (404): Being an output of WarpBack (403), $\Delta D$ is only defined on $\tilde{S}_D$, but $\Delta D$ is needed on $S_D$. Hence the undefined areas (given by the set $S_D / \tilde{S}_D$) are filled for instance by extrapolation. An extrapolation process is able to preserve edges in the motion field. The input of FillArea (404) consists of $\tilde{S}_D$, $S_D$ and the difference motion field $\Delta D$. In the output all motion vectors of $\Delta D$ on $S_D$ are defined.
5. Add (405): Finally this module adds $\Delta D$ to the preliminary motion field D and returns as output the new estimation for the motion field D.

For the backward compensation scheme the module MotionEstimationKernel (500) consists of tho following modules:

1. WarpBack (501): Backward warping of $I_T$ and $S_T$ with the motion field D to get the predictions $\tilde{I}_T$ and $\tilde{S}_T$ which are close to $I_D$ and $S_D$ in order to prepare good conditions for the following basic motion estimator.
2. BasicME (502): A basic motion estimator as described above (402). It receives $\tilde{I}_T$, $\tilde{S}_T$, $I_D$ and $S_D$ as input. The output is the estimated difference motion field from $I_D$ to $\tilde{I}_T$. It is defined in the same coordinate system than the preliminary motion field D.
3. Add (503): Finally this module adds $\Delta D$ to the preliminary motion field D and returns as output the new estimation for the motion field D (505).

Figure 6:
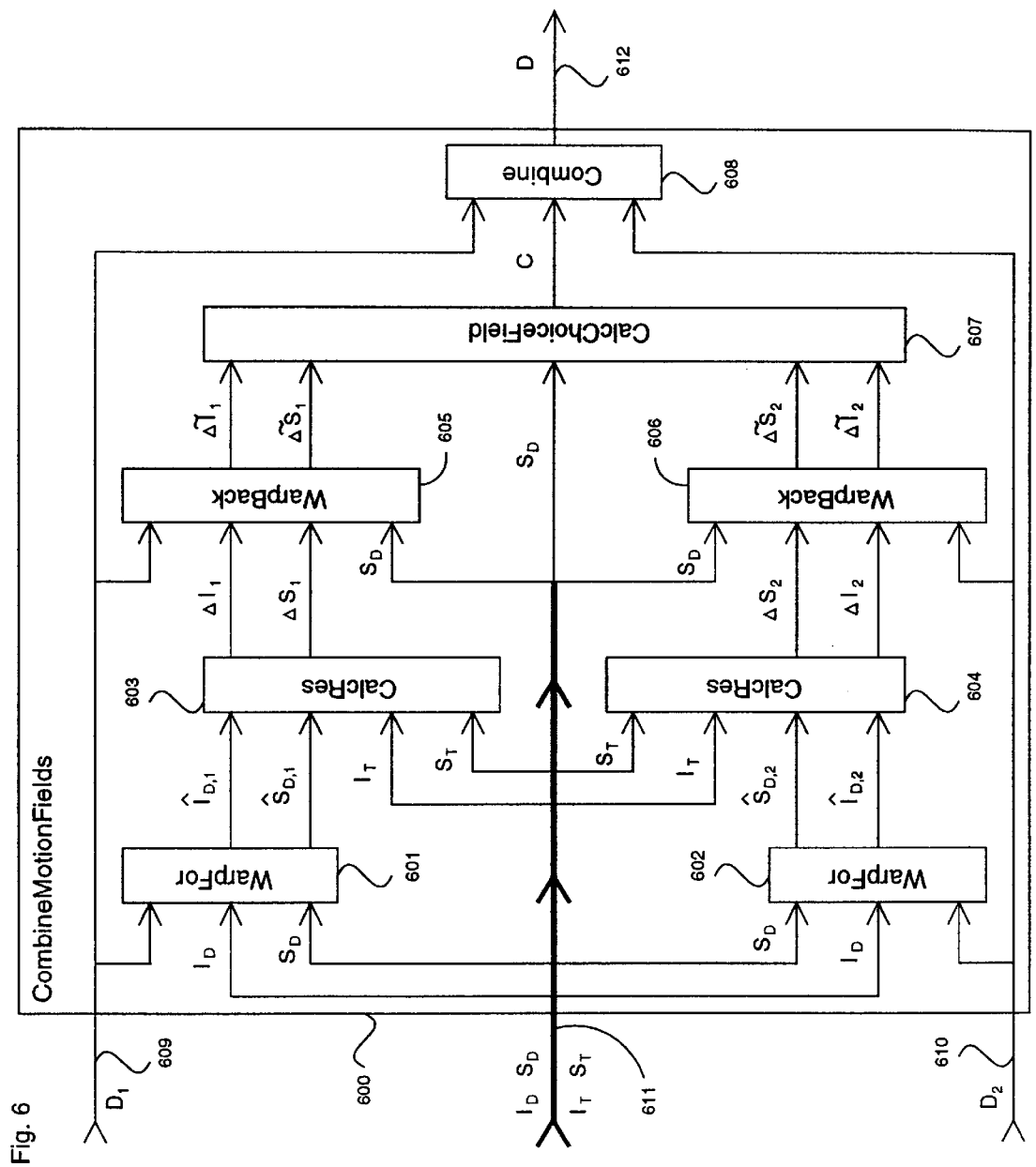
FIG. 6: Combination of two preliminary motion fields to an optimized final motion field with respect to prediction quality, referenced as module CombineMotionFields for a forward compensation scheme.
Figure 7:
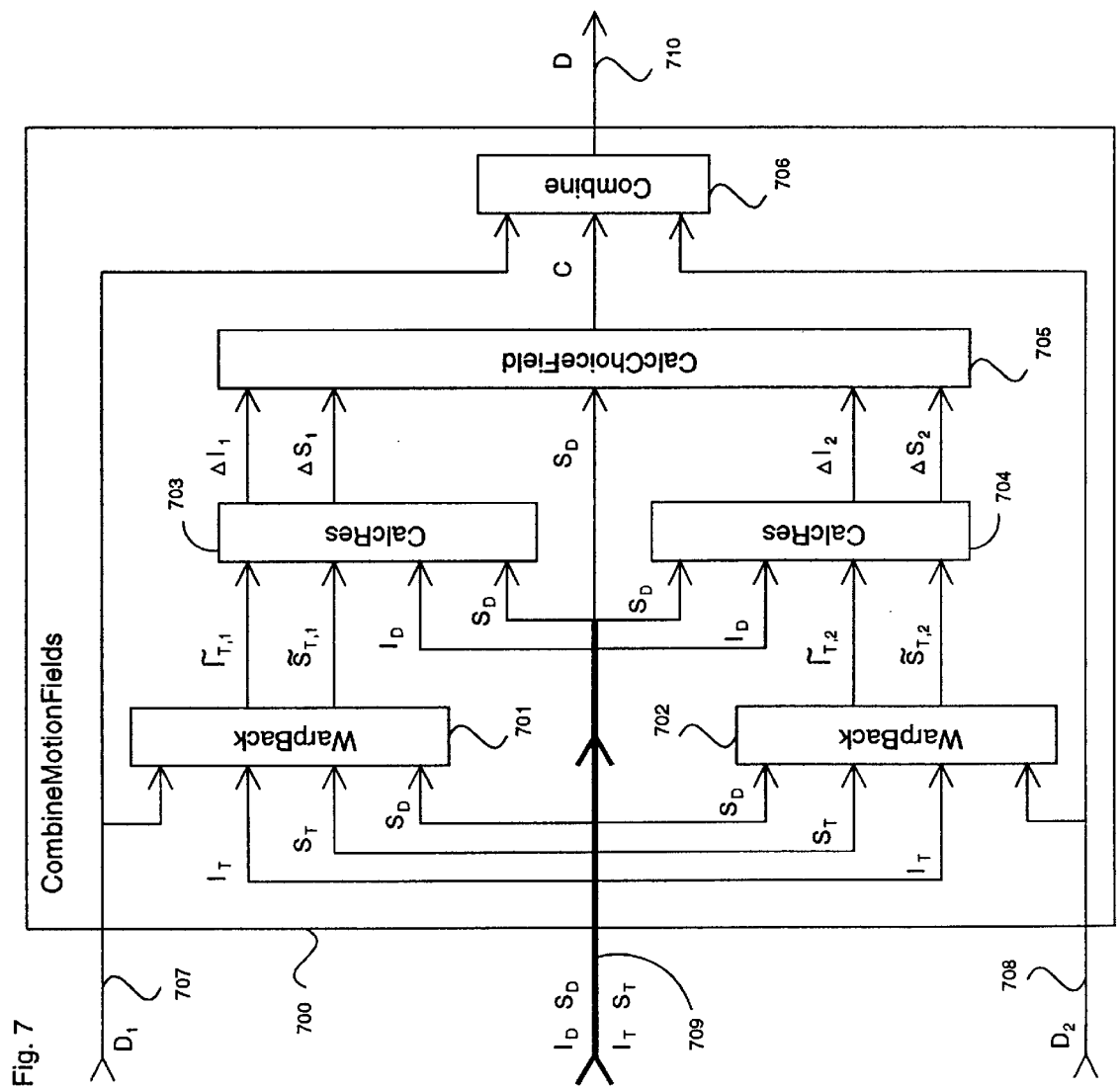
FIG. 7: Combination of two preliminary motion fields to an optimized final motion field with respect to prediction quality, referenced as module CombineMotionFields for a backward compensation scheme.

The module CombineMotionFields (203) will now be described with reference to FIG. 6 (for a forward compensation scheme) and FIG. 7 (for a backward compensation scheme). The module (600)(700) receives as input two preliminary motion fields $D_1$ (609)(707) and $D_2$ (610)(708). Furthermore an image $I_D$, a corresponding shape $S_D$, an image $I_T$ in target position and a corresponding shape $S_T$ are received (611)(709). The output (612)(710) is a motion field D which is an optimized combination of the fields $D_1$ and $D_2$ with respect to prediction quality. The module CombineMotionFields (600)(700) works different for a forward compensation scheme (600) and for a backward compensation scheme (700). For the forward compensation scheme the module CombineMotionFields (600) consists of the following modules:

1. WarpFor (601)(602): Forward warping of $I_D$ and $S_D$ with the motion field $D_1$ applying (601) to get predictions $\hat{I}_{D,1}$, $\hat{S}_{D,1}$ and with the motion field $D_2$ applying (602) to get predictions $\hat{I}_{D,2}$, $\hat{S}_{D,2}$ for the image $I_T$ and the shape $S_T$.
2. CalcRes (603)(604): Calculation of the residuals $\Delta I_1$, $\Delta S_1$ out of the predictions $\hat{I}_{D,1}$, $\hat{S}_{D,1}$ applying (609) and the residuals $\Delta I_2$, $\Delta S_2$ out of the predictions $\hat{I}D,2$, $\hat{S}_{D,2}$ applying (604). In general these residuals are functions of $I_T - \hat{I}_{D,i}$ under consideration of grand $S_T$ and $\hat{S}_{D,i}$. For example $\Delta I_i$ may be defined by $\Delta I_i = I_T - \hat{I}_{D,i}$ on $\Delta S_i =$ $S_T \cap \hat{S}_{D,i}$. These residuals are defined in the target position, but the combination is done in the coordinate system of the motion fields $D_i$. Hence the residuals are warped back to the coordinate system where the motion fields $D_i$ are defined by the following module:

3. WarpBack (605)(606): Backward warping of the residuals $\Delta I_1$, $\Delta S_1$ with the corresponding preliminary motion field $D_1$ applying (605) and backward warping of the residuals $\Delta I_2$, $\Delta S_2$ with the corresponding preliminary motion field $D_2$ applying (606). WarpBack (605) receives the preliminary motion field $D_1$ with the corresponding shape $S_D$ and the residuals $\Delta I_1$, $\Delta S_1$. The output consists of the warped back fields $\Delta I_1$ and $\Delta S_1$. WarpBack (606) works identically for the data $\Delta I_2$, $\Delta S_2$, $D_2$, $S_D$, $\Delta I_2$ and $\Delta S_2$.

4. CalcChoiceField (607): The warped back residuals $\Delta I_1$, $\Delta S_1$ and $\Delta I_2$, $\Delta S_2$ as well as the shape $S_D$ are used to compute a choice field C indicating whether a motion vector from $D_1$ or $D_2$ is preferred. The choice field C is defined for every pixel or block of pixels. In the simplest case each value of the choice field indicates which of the two residuals $\Delta I_1$, and $\Delta I_2$ has smaller absolute value under consideration of their shapes $\Delta S_1$ and $\Delta S_2$.

5. Combine (608): Finally the choice field C is used to calculate the final motion field D by building the union of the sets of selected motion vectors from the fields $D_1$ and $D_2$.

For the backward compensation scheme the module CombineMotionFields (700) consists of the following modules:

1. WarpBack (701)(702): Backward warping of $I_T$ and $S_T$ with the motion field $D_1$ applying (701) to get predictions $\tilde{I}_{T,1}$, $\tilde{S}_{T,1}$ and with the motion field $D_2$ applying (702) to get predictions $\tilde{I}_{T,2}$, $\tilde{S}_{T,2}$ the image $I_D$ and the shape $S_D$. In addition to the data $I_T$, $S_T$ and $D_i$ the module WarpBack (701)(702) receives as input the shape $S_D$ indicating where $D_i$ is valid.

2. CalcRes (703)(704): Calculation of the residuals $\Delta I_1$, $\Delta S_1$ out of the predictions $\tilde{I}_{T,1}$, $\tilde{S}_{T,1}$ applying (703) and the residuals $\Delta I_2$, $\Delta S_2$ out of the predictions $\tilde{I}_{T,2}$, $\tilde{S}_{T,2}$ applying (704). In general these residuals are functions of $I_D - \tilde{I}_{T,i}$ under consideration of $S_D$ and $\tilde{S}_{T,i}$. For example $\Delta I_i$ may be defined by $\Delta I_i = I_D - \tilde{I}_{T,i}$ on $\Delta S_i = S_D \cap \tilde{S}_{T,i}$. See as well (603)(604).

3. CalcChoiceField (705): The residuals $\Delta I_1$, $\Delta S_1$ and $\Delta I_2$, $\Delta S_2$ as well as the shape $S_D$ are used to compute a choice field C indicating whether a motion vector from $D_1$ or $D_2$ is preferred. The choice field C is defined for every pixel or block of pixels. In the simplest case each value of the choice field indicates which of the two residuals $\Delta I_1$ and $\Delta I_2$ has smaller absolute value under consideration of their shapes $\Delta S_1$ and $\Delta S_2$. See as well (607).

Figure 8:
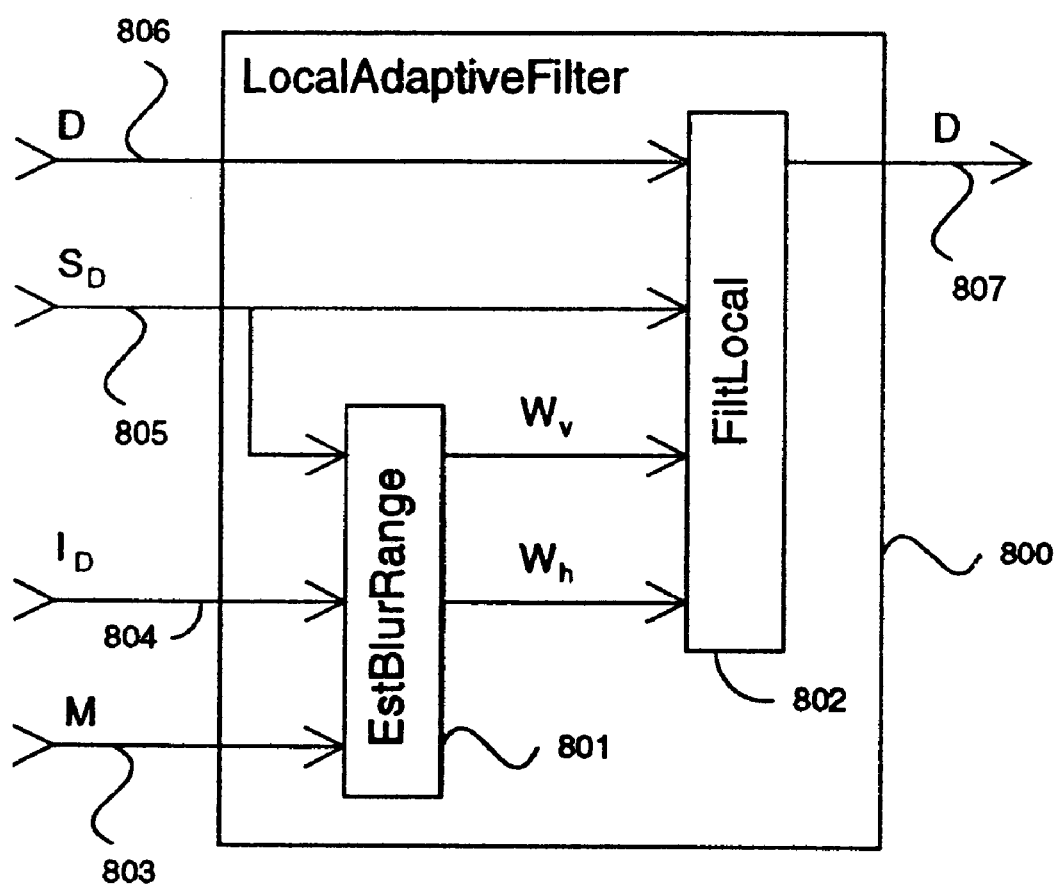
FIG. 8: Local adaptive filtering method, referenced as module LocalAdaptiveFilter.

The module LocalAdaptiveFilter (204) will now be described With reference to FIG. 8. The module (800) receives as input a preliminary motion field D (806) which has to be filtered, an image $I_D$ (804), the corresponding shape $S_D$ (805) and a maximal filter width M (803). The output is the filtered motion field D (807). LocalAdaptiveFilter (800) consists of the following modules:

1. EstBlurRange (801): Calculates a width of a low pass filter mask for vertical and horizontal direction for each pixel or block of pixels. This can be done with respect to the image $I_D$, the image $I_T$, a noise level, and the motion field D. The following example of an implementation as shown in FIG. 8, uses as input only $I_D$, the corresponding shape $S_D$ and a maximal filter width M as a control parameter. The filter widths are set in order to preserve edges in the motion field in high frequency areas of $I_D$ and to provide strong spatial propagation in low frequency areas which suffer from the aperture problem. The following method is one example which can be used:

Calculate the vertical and horizontal derivatives $\partial_v I_D$ and $\partial_h I_D$ by using for example a Sobel mask (Gonzalez and Wood).

Scale the absolute values of the derivatives so that the field is set to zero at the maximum value of the derivative and to the maximal filter width M at the minimum value of the derivative.

$$W_i(x, y) = M\left(1 - \frac{|\partial_i I_D(x, y)|}{\max_{x,y}(|\partial_i I_D(x, y)|)}\right) \quad i = v, h \quad (1)$$

where $W_i(x,y)$ represents the preliminary filter mask width at position $(x,y)$ for $i=v,h$, i.e. vertical and horizontal direction and M is the maximal allowed filter width given as input.

Quantize the preliminary filter width fields $W_v$ and $W_h$ with a given quantization step downwards. This quantization is optional and may be useful in order to consider the masks with a lookup table in FiltLocal (802).

To avoid propagation of information over edges the following method may be applied. The method is an operator which decreases oath value of $W_v$ and $W_h$ until the difference to one of its next neighbors is not bigger than one.

Finally the preliminary motion field components $D_v$ and $D_h$ are filtered by the following module (802) and returned as output (807).

1. FiltLocal (802): This module provides a spatial local adaptive filtering in horizontal and vertical direction. It takes as an input one or several fields $X_i$, their corresponding shapes $S_i$ and the filter width fields $W_v$ and $W_h$ which define the horizontal and vertical filter widths. All different filter masks which are needed are calculated and can be stored in a lookup table. Inside the convolution loop the filter coefficients and the filter width are taken from the lookup table in order to provide computation time comparable to convolution with constant filter masks. The convolution is performed separate for horizontal and vertical direction. The output consists of the filtered fields $X_i$. In FIG. 8 the fields $X_i$ are the horizontal and vertical components of the motion field D, i.e. $D_h$ and $D_v$. Alternatively FiltLocal could take an explicit 2-dimensional filter mask for each pixel. This allows explicit propagation of information.

Figure 9:
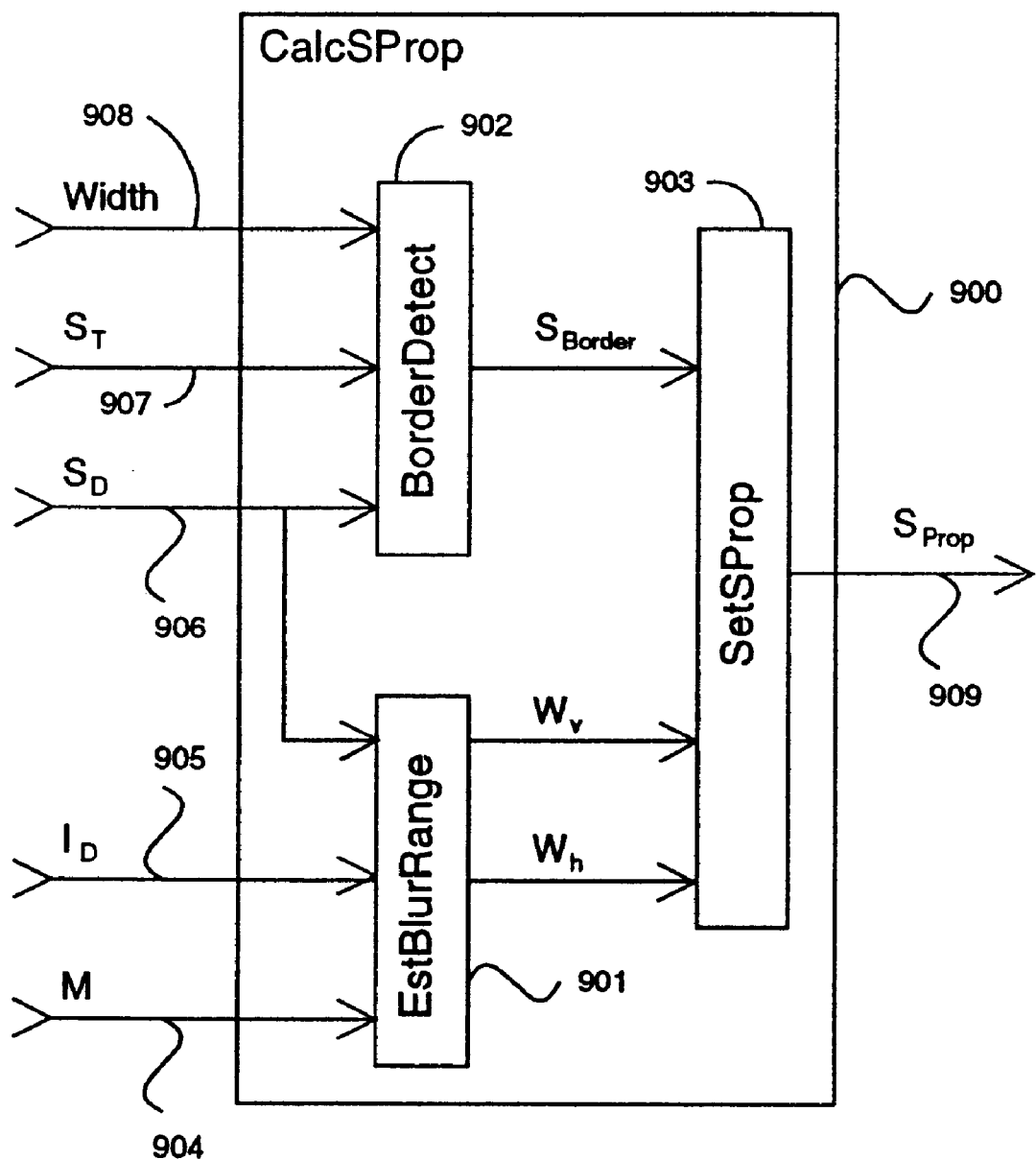
FIG. 9: Calculation of a propagation field for the prediction of motion fields, referenced as module CalcSProp.

The module CalcSProp (301) will now be described with reference to FIG. 9. The module (900) receives as input the image $I_D$ (905), the corresponding shape $S_D$ (906), the shape $S_T$ (907) in target position, the width Width (908) of the filter mask in Reduce (102)(103) and the maximal filter width M (904). The output is the validity field $S_{Prop}$ (909) which defines the pixels to be propagated in the pyramid. Propagation of motion vectors in high frequency areas can be suppressed by using the output field $S_{Prop}$. CalcSProp (900) consists of the following modules:

1. EstBlurRange (901): This module is fully described in (801). It receives $I_D$, $S_D$ and M as input (904)(905)

(906) and returns the filter width fields $W_v$ and $W_h$. These fields are used to correlate the propagation with intensity gradient of the image $I_D$ and with the applied local adaptive filtering (800).

2. BorderDetect (902): Detection of areas where shape borders exist in $S_T$ but not in $S_D$ and vice versa. The widths of the border areas are correlated with the width of the filter mask in Reduce (102) (103) due to the different treatment of these areas in Reduce (102)(163). Therefore BorderDetect (902) receives as input the shape fields $S_D$, $S_T$ and Width. The output is the shape field $S_{Border}$ which is invalid at border areas.

3. SetSProp (903): It receives $W_v$, $W_h$ and $S_{Border}$ as input. The setting of the final $S_{Prop}$ field can be described by the following equation $$S_{Prop} = S_W \cap S_{Border} \quad (2)$$

$$\text{with } S_W(x, y) = \begin{cases} 1 & \text{for } \min(W_v(x, y), W_h(x, y)) < c \\ 0 & \text{otherwise} \end{cases}$$

where c is a constant cut value. $S_{Prop}$ is returned as output.

SECOND PREFERRED EMBODIMENT

This embodiment is related to a forward compensation scheme. In FIG. 1 which shows the module MotionPyramid (100) (described in the first preferred embodiment) the original image $I_D$ with the corresponding shape $S_D$ and the hypothesis H is given as input (109). In the second preferred embodiment the hypothesis H is used to generate a frame $\hat{I}_D$, with a corresponding shape $\hat{S}_D$ which is closer to the image $I_T$ in target position. This results in less loss of displacement information during the reduce operations. The fields $\hat{I}_D$, $\hat{S}_D$ are used as input for the module MotionPyramid (100) instead of $I_D$, $S_D$. This preprocessing step is similar to the first step (401) in module MotionEstimationKernel (400) (see FIG. 4), preparing the input for the basic motion estimation module BasicME (402). Hence the output of the module MotionPyramid (100), which is the motion field D (110), must be post processed as in MotionEstimationKernel (400) by the modules (403),(404) and (405).

Figure 10:
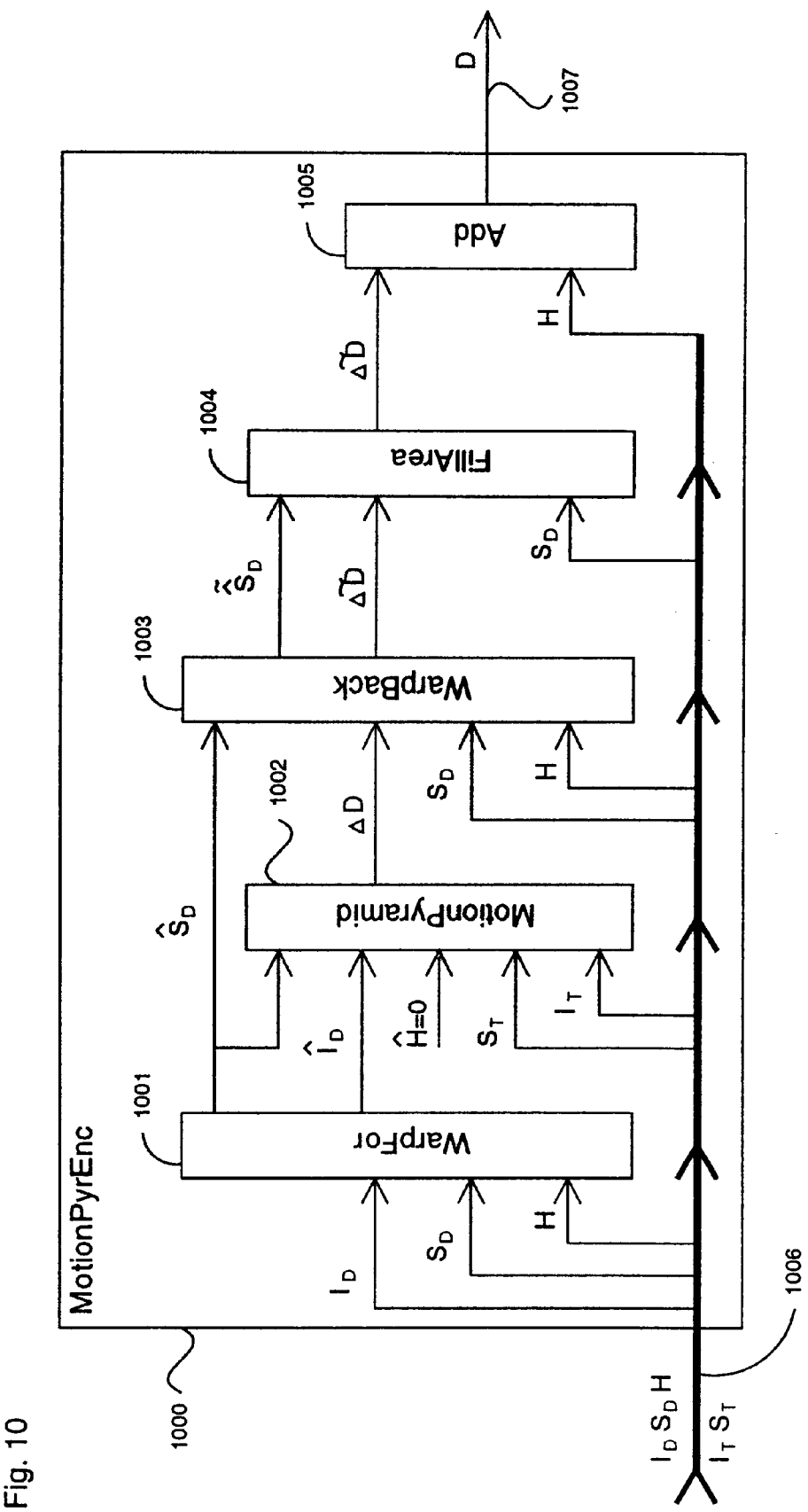
FIG. 10: Second preferred embodiment: Overview of a hierarchical motion estimation system with preprocessing and post processing, referenced as module MotionPyrEnc for a forward compensation scheme.

The whole process of this embodiment is shown in FIG. 10. The MotionPyrEnc (1000) (encapsulated motion pyramid) will now be described with reference to FIG. 10. The module (1000) receives as input (1006) an image $I_D$, a corresponding shape $S_D$, an image $I_T$ in target position, a corresponding shape $S_T$ and a hypothesis H. The output (1007) is the estimated motion field D from $I_D$ to $I_T$. MotionPyrEnc (1000) consists of the following modules:

1. WarpFor (1001): as WarpFor (401) in MotionEstimationKernel (400) with H instead of D.
2. MotionPyramid (1002): pyramidal motion estimation as described in the first preferred embodiment (100). It receives as input $\hat{I}_D$, $\hat{S}_D$, $I_T$, $S_T$ and a hypothesis $\hat{H}=0$. The output is the difference motion field $\Delta D$ which is the displacement field from $\hat{I}_D$ to $I_T$.
3. WarpBack (1003): Backward warping of the difference motion field $\Delta D$ as WarpBack (403) in MotionEstimationKernel (400) with H instead of D.
4. FillArea (1004): as FillArea (404) in MotionEstimationKernel (400).
5. Add (1005): Adds $\Delta D$ to the hypothesis H and returns as output the motion field D.

THIRD PREFERRED EMBODIMENT

Figure 11:
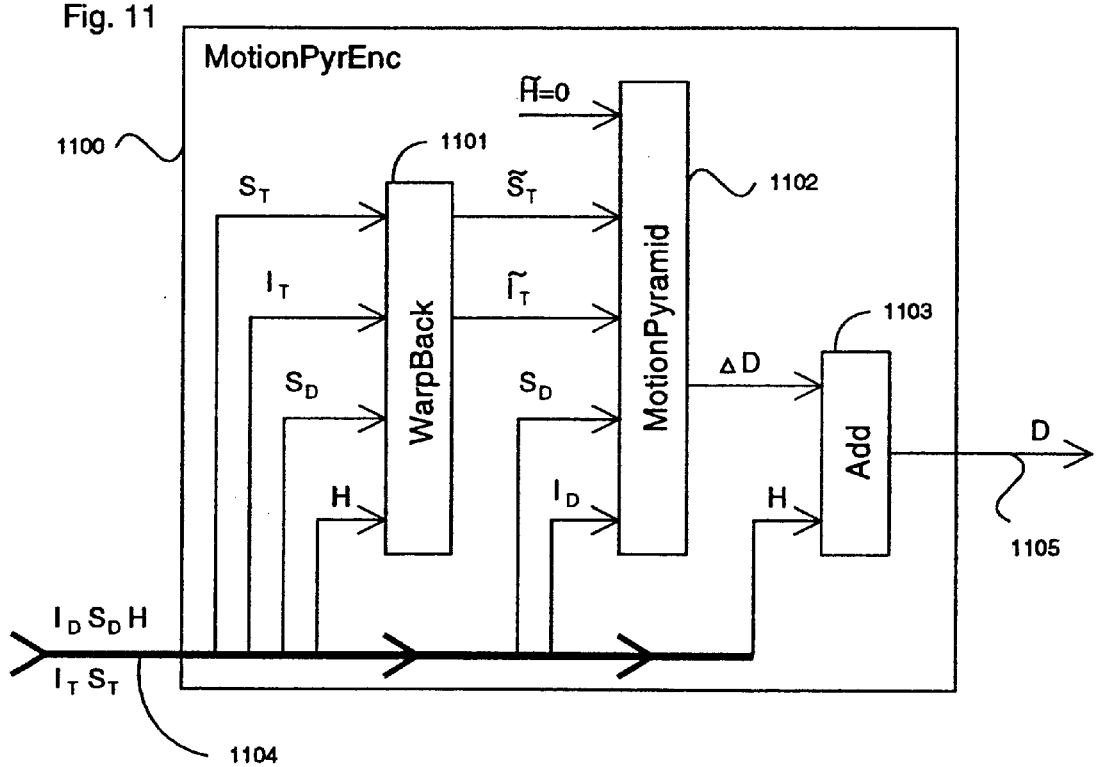
FIG. 11: Second preferred embodiment: Overview of a hierarchical motion estimation system with preprocessing and post processing, referenced as module MotionPyrEnc for a backward compensation scheme.

This embodiment is related to a backward compensation scheme. Analogous to the second preferred embodiment the hypothesis H is used to generate a frame $\tilde{I}_T$, with a corresponding shape $\tilde{S}_T$ which is closer to the image $I_D$. The fields $\tilde{I}_T$, $\tilde{S}_T$ are used as input for the module MotionPyramid (100) instead of $I_T$, $S_T$. This preprocessing step is similar to the first step (501) in module MotionEstimationKernel (500) (see FIG. 5), preparing the input for the basic motion estimation module BasicME (502). The whole process of this embodiment is shown in FIG. 11. The MotionPyrEnc (1100) (encapsulated motion pyramid) will now be described with reference to FIG. 11. The module (1100) receives as input (1104) an image $I_D$, a corresponding shape $S_D$, an image $I_T$ in target position, a corresponding shape $S_T$ and a hypothesis H. The output (1105) is the estimated motion field D from $I_D$ to $I_T$. MotionPyrEnc (1100) consists of the following modules:

1. WarpBack (1101): as WarpBack (501) in MotionEstimationKernel (500) with H instead of D.
2. MotionPyramid (1102); pyramidal motion estimation as described in the first preferred embodiment (100). It receives as input $\tilde{I}_T$, $\tilde{S}_T$, $I_D$, $S_D$ and a hypothesis $\tilde{H}=0$. The output is the difference motion field $\Delta D$ which is the displacement field from $I_D$ to $\tilde{I}_T$.
3. Add (1103): Adds $\Delta D$ to the hypothesis H and returns as output the motion field D.

FOURTH PREFERRED EMBODIMENT

This embodiment presents methods for setting the motion hypothesis H as input for motion estimators in a forward compensation scheme. These methods may be applied for a sequence of related images. Motion estimation is performed from an image $I_D$ to subsequent target images $I_{T,n}$ (n=1,2,3, ... ). The sequence needs not to consist of images at subsequent time Steps, but may be generated in any way. A subsequent estimation process from $I_D$ to $I_{T,1}$, $I_{T,2}$, ... , $I_{T,n}$, ... is performed. The motion fields from $I_D$ to $I_{T,n}$ are given by $D_n$. The hypothesis $H=H_n$ for the motion estimation from image $I_D$ to $I_{T,n}$ using for example (100) or (1000) may be set to:

1. $H_n=D_{n-1}$: The hypothesis is set to the motion field of the preceding estimation in order to track large motion over several images.
2. $H_n=D_{n-1}+(D_{n-1}-D_{n-2})$: The hypothesis is set to the motion field of the preceding estimation added to the change of motion in order to provide a good hypothesis for monotonous movement.
3. $H_n(\kappa)=D_{n-1}+\kappa(D_{n-1}-D_{n-2})$: In the simplest case $\kappa$ can be a constant number. $\kappa$ is chosen to minimize $<\|H(\kappa)-D\|>$ where $\| \ldots \|$ is a norm and $< \ldots >$ (representing an averaging over a set of sequences. For example, $\kappa$ can be determined empirically by minimizing an average over a lot of deviations occurring in different earlier estimated sequences, i.e.

$$\langle\|H(\kappa) - D\|\rangle = \frac{1}{M+1}\sum_{n=N}^{N+M} \|H_n(\kappa) - D_n\|$$

$$= \frac{1}{M+1}\sum_{n=N}^{N+M} \|D_{n-1} + \kappa(D_{n-1} - D_{n-2}) - D_n\|$$

4. with respect to $\kappa$. The average $<\|(\kappa)-D\|>$ can be calculated over a certain number of former estimations which provides an adaptive adjustment of $\kappa$ due to acceleration processes.

Instead of one single hypothesis H a set of hypotheses may be given as input to the motion estimators. For example in module MotionPyramid (100) such a set may be used to initialize the motion field D with different values at the coarsest pyramid level. At a certain level the set of fields D may be combined to one single optimized motion field by applying the module CombineMotionFields (600). The set of hypotheses may be used at every pyramid level within CombineMotionFields (600), too. In module MotionPyrEnc (1000) a set of hypotheses may be used to generate a set of images $\hat{I}_D$ with corresponding shapes $\hat{S}_D$. Each member of this set may be used as input for module MotionPyramid (1002) leading to a set of motion fields D. These motion fields may then be combined to one single optimized motion field by applying the module CombineMotionFields (600).

In FIG. 10 which describes the module MotionPyrEnc (1000) the module MotionPyramid (1002) is applied with $\hat{H}=0$. In order to stabilize the whole process other realizations of the hypothesis $\hat{H}$ may be used. For example the difference between the motion field $D_{n-1}$ and the hypothesis $H_{n-1}$ of the preceding estimation may be used. This difference may be warped to the position of $\hat{I}_D$ applying the module WarpFor (1001) for $D_{n-4}$-$H_{n-1}$ with the hypothesis $H_n$ as motion field. Moreover a set of hypotheses $\hat{H}$ may be used as input for module MotionPyramid (1002).

FIFTH PREFERRED EMBODIMENT

This embodiment presents methods for setting the motion hypothesis H as input for motion estimators in a backward compensation scheme. These methods may be applied for a sequence of related images. Motion estimation is performed from a subsequent set of images $I_{D,n}$ (n=$_{1,2,3}$, . . . ) to a target image $I_T$. The sequence needs not to consist of images at subsequent time steps, but may be generated in any way. A subsequent estimation process from $I_{D,1}, I_{D,2}, \ldots, I_{D,n}, \ldots$ to $I_T$ is performed. The motion fields from $I_{D,n}$ to $I_T$ are given by $D_n$.

Figure 12:
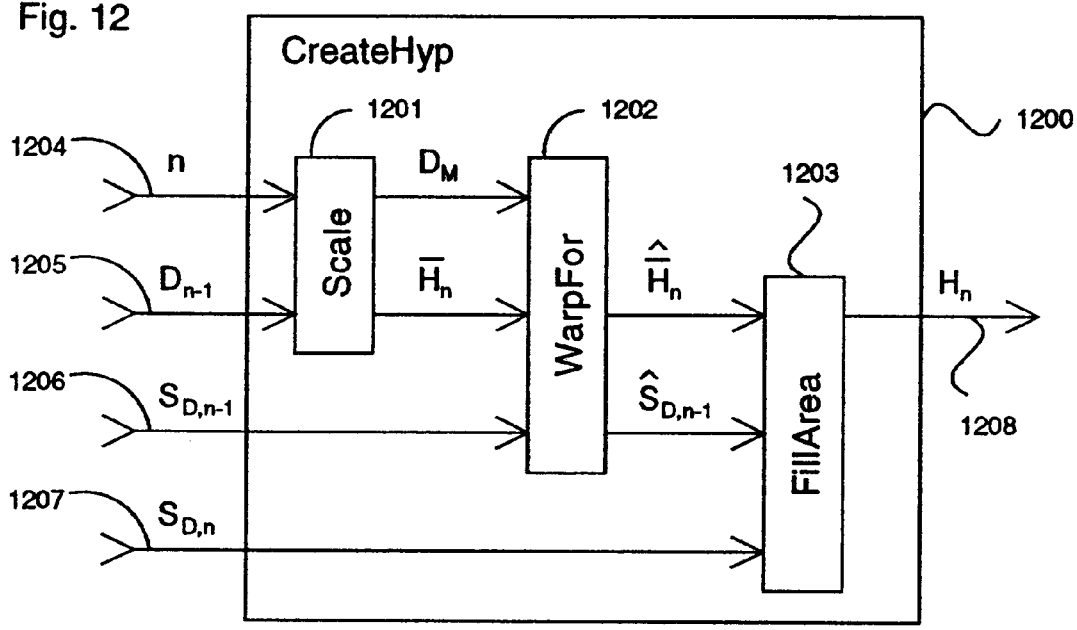
FIG. 12: Creation of a motion field hypothesis in a subsequent motion estimation process of a sequences of images for a backward compensation scheme, referenced as module CreateHyp.

In the case where the index n is the distance from the $I_{D,n}$ to $I_T$, the hypothesis H=$H_n$ for the motion estimation from image $I_{D,n}$ to $I_T$ using for example (100) or (1100) may be set by the module CreateHyp (1200). This module will now be described with reference to FIG. 12. The module (1200) receives as input the distance n (1204), the motion field $D_{n-1}$ (1205) with its corresponding shape $S_{D,n-1}$ (1206) and the shape $S_{D,n}$ (1207) indicating where the output hypothesis $H_n$ (1208) is valid. CreateHyp (1200) consists of the following modules:

1. Scale (1201): It receives n and $D_{n-1}$ and delivers as output two scaled motion fields. The first field $D_M$ is given by $$D_M = -\frac{1}{n-1} D_{n-1}$$

and is used as a motion field for the following WarpFor module. The second field $\overline{H}_n$ is given by $$\overline{H}_n = \frac{n}{n-1} D_{n-1}$$

and is a preliminary hypothesis. Since this hypothesis is defined in the position of $S_{D,n-1}$ it is warped to the position of $S_{D,n}$ by the following module.

2. WarpFor (1202): It receives the motion field $D_M$, the hypothesis $\overline{H}_n$ and the shape $S_{D,n-1}$. It performs a forward warping of the two components of $\overline{H}_n$ and its corresponding shape $S_{D,n-1}$. The output is the warped hypothesis $\hat{\overline{H}}_n$ and the shape $\hat{S}_{D,n-1}$. In general the shape $\hat{S}_{D,n-1}$ is a subset of $S_{D,n}$ (i.e. $\hat{S}_{D,n-1} \subseteq S_{D,n}$). Hence $\overline{\overline{H}}_n$ must be filled by the following module.

3. FillArea (1203): The input of FillArea (1203) consists of $\hat{S}_{D,n-1}$, $S_{D,n}$ and $\overline{\overline{H}}_n$. The undefined areas of $\overline{\overline{H}}_n$ (given by the set $S_{D,n} \backslash \hat{S}_{D,n-1}$) are filled for instance by extrapolation. As output FillArea (1203) delivers the hypothesis $H_n$ where all vectors on $S_{D,n}$ are defined.

In general a more simpler way to get a hypothesis $H_n$ is to neglect the fact that the fields $D_i$ are not given in the same position. Then the same estimations as in the preceding embodiment can be used: $H_n=D_{n-1}$, $H_n=D_{n-1}+(D_{n-1}-D_{n-2})$ or $H_n=D_{n-1}+\kappa(D_{n-1}-D_{n-2})$ ($\kappa$ being a number).

Instead of one single hypothesis H a set of hypotheses may be given as input to the motion estimators. For example in module MotionPyramid (100) such a set may be used to initialize the motion field D with different values at the coarsest pyramid level. At a certain level the set of fields D may be combined to one single optimized motion field by applying the module CombineMotionFields (700). The set of hypotheses may be used at every pyramid level within CombineMotionFields (700), too. In module MotionPyrEnc (1100) a set of hypotheses may be used to generate a set of images $\tilde{I}_T$ with corresponding shapes $\tilde{S}_T$. Each member of this set may be used as input for module MotionPyramid (1102) leading to a set of motion fields D. These motion fields may then be combined to one single optimized motion field by applying the module CombineMotionFields (700).

In FIG. 11 which describes the module MotionPyrEnc (1100) the module MotionPyramid (1102) is applied with $\tilde{H}=0$. In order to stabilize the whole process other realizations of the hypothesis $\tilde{H}$ may be used.

SIXTH PREFERRED EMBODIMENT

This embodiment presents the usage of preceding estimations in a backward compensation scheme performing motion estimation from a subsequent set of images $I_{D,n}$ (n=1,2,3, . . . ) to a target image $I_T$. The sequence needs not to consist of images at subsequent time steps, but may be generated in any way. A subsequent estimation process from $I_{D,1}, I_{D,2}, \ldots, I_{D,n}, \ldots$ to $I_T$ is performed. The motion fields from $I_{D,n}$ to $I_T$ are given by $D_n$. In order to get $D_n$ the motion field $D_{n-1}$ is used by the module MotionPyrSeq (1300) as a kind of hypothesis.

The module MotionPyrSeq (1300) will now be described with reference to FIG. 13. The module (1300) receives as input (1306) the image $I_{D,n}$, the corresponding shape $S_{D,n}$, the motion field $D_{n-1}$ and the corresponding shape $S_{D,n-1}$ as well as the image $I_T$ in target position (1307) and the corresponding shape $S_T$. The output (1309) of the module MotionPyrSeq (1300) is the estimated motion field $D_n$ from $I_{D,n}$ to $I_T$. The module (1300) consists of the following modules:

1. WarpBack (1301): Backward warping of $I_T$ and $S_T$, with the motion field $D_{n-1}$ which is valid on the corresponding shape $S_{D,n-1}$. The output consists of the warped back fields $\tilde{I}_T$ and $\tilde{S}_T$.

2. MotionPyramid (1302): Pyramidal motion estimation as described in the first preferred embodiment (100). It receives as input $\tilde{I}_T$, the corresponding shape $\tilde{S}_T$, $I_{D,n}$, the corresponding shape $S_{D,n}$ and a hypothesis $H_n$=0. The output is the difference motion field $\Delta D$ which is the displacement field from $I_{D,n}$ to $\tilde{I}_T$. The difference motion field $\Delta D$ is defined in the position of $I_{D,n}$, but the motion field $D_{n-1}$ is defined in the position of $I_{D,n-1}$ (respectively $S_{D,n-1}$). Hence for a combination with $\Delta D$ the motion field $D_{n-1}$ must be warped back to the position of $I_{D,n}$ by the following module.

3. WarpBack (1303): Backward warping of the motion field $D_{n-1}$. It receives the motion field $\Delta D$ with the corresponding shape $S_{D,n}$ and the fields to be warped back: the motion field $D_{n-1}$ with the corresponding shape $S_{D,n-1}$. The output consists of the fields $\tilde{D}_{n-1}$ and $\tilde{S}_{D,n-1}$, both warped back by the motion field $\Delta D$. Due to the warp back operation the shape $\tilde{S}_{D,n-1}$ is a subset of $S_{D,n}$ (i.e. $\tilde{S}_{D,n-1} \subseteq S_{D,n}$).

4. FillArea (1304): As output from WarpBack (1303) $\tilde{D}_{n-1}$ is only defined on $\tilde{S}_{D,n-1}$, but needed on $S_{D,n}$. Hence the undefined areas (given by the set $S_{D,n} \setminus \tilde{S}_{D,n-1}$) are filled for instance by extrapolation within the module FillArea (1304). FillArea (1304) receives as input $S_{D,n}$, $\tilde{S}_{D,n-1}$ and $\tilde{D}_{n-1}$ and delivers as output $\hat{D}_{n-1}$ defined on $S_{D,n}$.

5. Add (1305): Finally this module adds $\Delta D$ to $\hat{D}_{n-1}$ and returns as output the motion field $D_n$.

Figure 13:
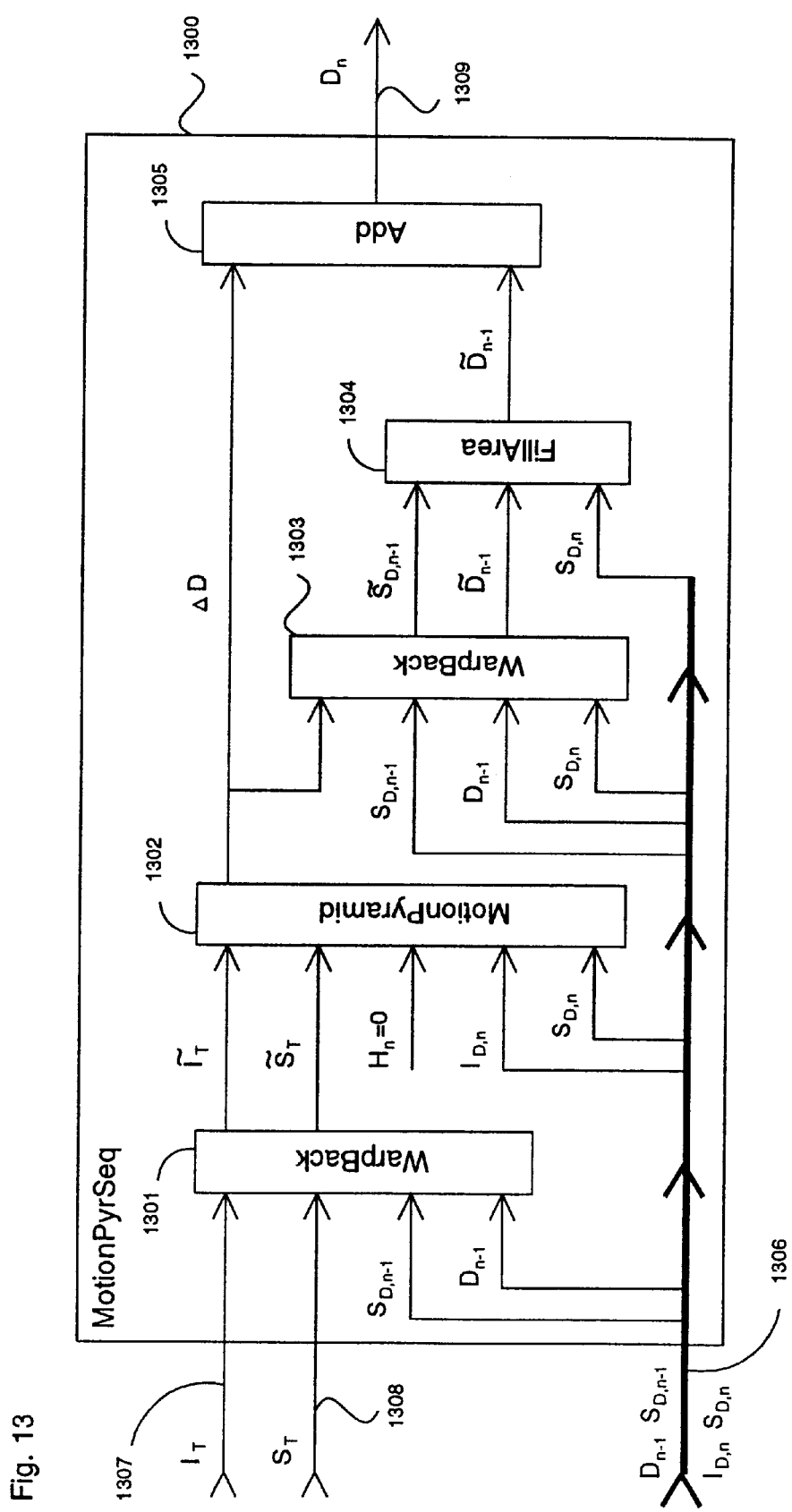
FIG. 13: Overview of a hierarchical motion estimation system with preprocessing and post processing for a backward compensation scheme in a subsequent motion estimation process, referenced as module MotionPyrSeq.

In FIG. 13 the module MotionPyramid (1302) is applied with $H_n=0$. In order to stabilize the whole process other realizations of the hypothesis $H_n$ may be used.

Moreover instead of the module MotionPyramid (100) the module MotionPyrEnc (1100) may be used.

SEVENTH PREFERRED EMBODIMENT

This embodiment is related to a forward compensation scheme. The module MotionPyramid (100) and MotionPyrEnc (1000) described in former embodiments deliver a motion field D from $I_D$ to $I_T$. In order to stabilize or improve the quality of this field a post processing step is performed. In this step the output motion field D (110) from (100) or (1007) from (1000) together with $I_D$, $I_T$, $S_D$, $S_T$ is used as input (406) for the module MotionEstimationKernel (400). Due to this the image $\hat{I}_D$ used within (400) for the module BasicME (402) is very close to the image $I_T$. Hence the motion field $\Delta D$ contains last small corrections for the final motion field D (407) returned as output from (400),

EIGHTH PREFERRED EMBODIMENT

This embodiment is related to a backward compensation scheme. The module MotionPyramid (100) and MotionPyrEnc (1100) described in former embodiments deliver a motion field D from $I_D$ to $I_T$. As in the preceding embodiment a post processing step is performed in order to improve quality. In this step the output motion field D (110) from (100) or (1107) from (1100) together with $I_D$, $I_T$, $S_D$, $S_T$ is used as input (506) for the module MotionEstimationKernel (500). Due to this the image $\tilde{I}_T$ used within (500) for module BasicME (502) is very close to the image $I_D$. Hence the motion field $\Delta D$ contains last small corrections for the final motion field D (507) returned as output from (500). This post processing step can be done after the module MotionPyrSeq (1300), too. The output motion field $D_n$ (1309) from (1300) together with $I_{D,n}$, $S_{D,n}$ (part of 1306), $I_T$ (1307) $S_T$ (1308) is used as input (506) for the module MotionEstimationKernel (500). The output from (500) is the final motion field D (507) from $I_{D,n}$ to $I_T$.

NINTH PREFERRED EMBODIMENT

In this embodiment variations of the CombineMotionFields modules (600) and (700) are presented.

The methods are not restricted to two motion fields. Due to the parallel application of methods on the motion fields an extension to more than two preliminary motion fields is possible.

A median filter can be applied on the choice field C in order to eliminate outliers and provide a smoother motion field D as output (612)(710).

The choice field can also be improved by replacing oath value in the choice field with a new value which minimizes a cost function. For example the cost function is given by a weighted sum of the residual values and the corresponding roughness values of the choice field C. This can be done by applying the "Agree filter" as described in Method and Apparatus for Compressing Video, already included by reference. For example the choice field C(p) is required for N motion fields at every pixel p. Hence N residuals $\Delta I_i$ with $i \in \{1, \ldots, N\}$ exist. The "Agree filter" filter determines for each pixel p a choice value $i_0$, i.e. $C(p)=i_0$, which minimizes a function $F_p(i)$, i.e. $F_p(i_0) \leq F_p(i)$ $\forall i \in \{1, \ldots, N\}$. Examples for the function $F_p(i)$ are:

1. $F_p(i) = |\Delta I_i(p)| + k \sum_{q \in Neigh(p)} |\Delta I_i(q)|$

2. $F_p(i) = |\Delta I_i(p)| + k \sum_{q \in Neigh(p)} \xi(i, C(q))$

3. $F_p(i) = (1 + |\Delta I_i(p)|) \left( 1 + k \sum_{q \in Neigh(p)} \xi(i, C(q)) \right)$ where $\kappa$ denotes a weighting constant, Neigh(p) a set of spatial neighbor pixels of pixel p and the function $\xi(i,j)$ is given by:

$$\xi(i, j) = \begin{cases} 1 & \text{for } i \neq j \\ 0 & \text{for } i = j \end{cases}$$

In the second and third example an iteration is performed in order to find the final choice field.

Another way to get a choice field which minimizes a cost function is the application of the calculus of variation.

Low pass filtering of the residuals $\Delta I_i$ in (600) or $\Delta I_i$ in (700) may be done before calculating the choice field C in order to reduce the influence of noise. Moreover masking effects of the human visual system can be considered and used to filter the residuals as for instance described in Method and apparatus for compression of video images and Image Residuals, already included by reference.

Due to the information loss of the WarpFor (601) WarpBack (605) methods with $D_1$ and the WarpFor (602) WarpBack (606) methods with $D_2$ in (600) or WarpBack (701) with $D_1$ and WarpBack (702) with $D_2$ in (700) it is possible that prediction quality achieved using D is not better than the prediction quality achieved using $D_1$ or $D_2$. This can happen in some special cases and can be avoided by using the following method:

In the case of forward compensation scheme (600) with the final combined motion field D (612) a prediction $\hat{I}_D$ using WarpFor (601) is done and a residual is calculated by CalcRes (603). In the case of backward compensation scheme (700) with the final combined motion field D (710) a prediction $\tilde{I}_T$ using WarpBack (701) is done and a residual is calculated by CalcRes (703). In both cases the achieved residual is compared with the residuals generated by applying the preliminary motion fields $D_i$. The final motion field D is set to the field which delivered the best prediction quality.

For example the modules CombineMotionFields (600) and (700) can be used for:

1. Combination of an estimated motion field with a preliminary hypothesis.

2. Combination of an estimated motion field with a preliminary hypothesis and a predicted motion field achieved using the preliminary hypothesis.
3. Combination of a set of estimated motion fields generated by motion estimation on different color channels.
4. Combination of a set of estimated motion fields generated by motion estimation on different resolution levels and the following Reduce or Expand applications.

TENTH PREFERRED EMBODIMENT

In this embodiment variations of the PropagateExpand module (300) are presented.

In addition to the input (306) of the PropagateExpand module (300), a confidence measurement can be taken into account for the calculation of $S_{Prop}$ as well. For example, the degree of confidence is found by counting how far an estimated motion vector may be changed without a corresponding displaced frame difference exceeding a given threshold.

As an alternative the module PropagateExpand (300) can be arranged as follows:

1. Expand the motion field.
2. Calculate a confidence field indicating, to what degree of confidence each pixel or group of pixels in the expanded field is given.
3. Replace each motion vector in the expanded motion field with a weighted sum of motion vectors in a neighborhood around the motion vector, the weights being the degree of confidence for each motion vector, normalized with the sum of weights for the neighborhood.

The method can be applied for motion estimates in a time series, too.

ELEVENTH PREFERRED EMBODIMENT

In this embodiment variations of the EstBlurRange module (801) or (901) are presented.

In addition or instead of the input image $I_D$ the motion field components can be taken into account. The components of the motion fields are treated in the same way as the image $I_D$ as described above. This process yields preliminary filter width fields from oath motion component $D_v$, $D_h$ and from $I_D$. These preliminary filter width fields can be combined to optimized width fields $W_v$ and $W_h$ followed by quantization. Finally an operator is applied which decreases each value of $W_v$ and $W_h$ until the difference to one of its next neighbors is not bigger than one.

Instead of using the maximum value of the derivative for scaling the filter width field in Eq. 1 a function $F=F(\partial_i I_D(x, y))$ can be applied. As an example the minimum from $$\max_{x,y}(|\partial_i I_D(x, y)|)$$

and a constant $\gamma$ can be chosen. To avoid negative values a clipping must be introduced. Hence Eq. 1 may be replaced by:

$$W_i(x, y) = \max\left(M\left(1 - \frac{|\partial_i I_D(x, y)|}{\min\left(\max_{x,y}(|\partial_i I_D(x, y)|), \gamma\right)}\right), 0\right) \quad i = v, h \quad (3)$$

Using Eq. 3 filtering on small edges due to one very hard edge can be avoided.

The first preferred embodiment provides high propagation perpendicular to the intensity gradient if the intensity gradient has horizontal or vertical direction. This approach can be extended to provide high propagation perpendicular to the intensity gradient in general by the following method: EstBlurRange (801) can return a filter mask for every motion vector. The filter mask is defined to provide a low-pass filtering perpendicular to the intensity gradient. FiltLocal (802) has to take an explicit filter mask for every pixel which has to be filtered. As in the former version the filter masks can be stored in a lookup table in order achieve low computation times.

In order to avoid a big lookup table, an iterative application of the module FiltLocal (802) may be performed.

TWELFTH PREFERRED EMBODIMENT

This embodiment is related to a backward compensation scheme. In order to reduce complexity, memory amount and computation time some modifications of the structure may be done. Motion estimation is performed from an image $I_D$ to subsequent target images $I_{T,n}$ (n=1,2,3, . . . ). In such a situation all data in position of $I_D$ do not change and may be calculated only once. For example, the filter width fields $W_v$ and $W_h$ may be calculated only once on each pyramid level by the module EstBlurRange (801) and stored for next estimation. Due to this, the module EstBlurRange (801) may be skipped in module LocalAdaptiveFilter (800) and module EstBlurRange (901) may be skipped in CalcSProp (900). Also the calculation of $S_{Prop}$ can be performed only once on every pyramid level and stored for the next estimation. Hence the module CalcSProp (900) can be skipped performing the next estimation.

THIRTEENTH PREFERRED EMBODIMENTS

The control modules (101)(201) need not only be used to control the parameters of the methods. They are used as well to switch on and off the methods which are to be applied. For example in Module PyramidKernel (200) the module CombineMotion (203) may switched off on the finest pyramid level in some applications in order to reduce complexity, memory amount and computation time. Moreover the control modules (101)(201) may be used to apply a certain module more than once or to control iterative processes.

The invention as described herein can be implemented by a program which runs on a general purpose computer, it may also be implemented for example by a specially configured chip, such as an ASIC, or for example it may be implemented by means of a Digital Signal Processor DSP. It may also be implemented by a program stored on a computer readable data carrier or by means of a program which is transmitted to the user or to the computer on which it runs by any transmission link, like e.g. also via the internet.

What is claimed is:

1. A method for estimating a motion field from a first image with a corresponding first shape to a second image with a corresponding second shape, wherein a hypothesis motion field is given, the motion fields having one motion vector for each valid pixel or valid block of pixels in the first image, the method comprising the steps:

(1) successive low pass filtering and sub sampling of the first image, the first corresponding shape, the second image, the second corresponding shape and the hypothesis motion field, until a given coarsest resolution level is reached, thereby producing multi resolution representations, (2) setting a preliminary motion field on the coarsest resolution level equal to the coarsest hypothesis motion field, (3) estimating a motion field on the coarsest resolution level from the first image to the second image by taking into account the first image, the first shape, the second image, the second shape, the preliminary motion field and the hypothesis motion field, and starting the following steps with the coarsest resolution level, (4) propagating and expanding the estimated motion field of the current coarse resolution level, producing a preliminary motion field for the next finer resolution level by taking into account the estimated motion field and the first shape of the coarse resolution level, the first image, the first shape and the second shape of the finer resolution level, (5) estimating a motion field on the finer resolution level from the first image to the second image producing an estimated motion field for the finer resolution level by taking into account the first image, the first shape, the second image, the second shape, the preliminary motion field and by using the hypothesis motion field, said hypothesis motion field being used to improve the estimated motion field, all on the finer resolution level, (6) identifying the new coarse resolution level with the old finer resolution level and repeat steps (4) and (5) until the finest resolution level is reached.

2. The method according to claim 1, wherein step (4) of claim 1 comprises a method for estimating a fine resolution representation of a motion field from a first image with a first shape to a second image with a second shape, wherein coarse resolution representations of the motion field and the first shape and fine resolution representations of the first image, the first shape and the second shape are given, the method comprising the steps:

(1) up sampling of the coarse resolution motion field, producing the fine resolution motion field taking into account the coarse resolution first shape and the fine resolution first shape, (2) calculating a degree of confidence for each motion vector of the fine resolution motion field taking into account the fine resolution first image, the fine resolution first shape and the fine resolution second shape, (3) replacing each motion vector in the fine resolution motion field with a weighted sum of motion vectors in a neighborhood around the motion vector, the weights being the degree of confidence for each motion vector, normalized by the sum of weights for the neighborhood, or replacing the values of each motion vector in the fine resolution motion field whose confidence is smaller than a given threshold with values extrapolated from the nearest neighbors with confidence larger than or equal to the threshold.

3. The method according to claim 2, wherein the degree of confidence depends on the gradient of the fine resolution first image taking into account the fine resolution first shape, a high gradient leading to a small degree of confidence, and/or wherein the degree of confidence is set to low values in areas where borders exist in the fine resolution first shape and not in the fine resolution second shape and vice versa.

4. The method according to claim 3, wherein the extension of the areas is correlated to the width of the filter used for sub sampling.

5. The method according to claim 2, wherein the degree of confidence is found by measuring how strong the displaced frame difference depends on a change of the motion field, or wherein the degree of confidence depends on the gradient of the fine resolution motion field, a high gradient leading to a small degree of confidence.

6. The method according to claim 1, wherein steps (3) and (5) of claim 1 comprise a method for estimating a motion field from a first image with a corresponding first shape to a second image with a corresponding second shape, wherein a preliminary motion field and a hypothesis motion field is given, the motion fields having one motion vector for each valid pixel or valid block of pixels in the first image, the method comprising the steps:

(1) estimating a motion field from the first image to the second image by taking into account the first image, the first shape, the second image, the second shape and the preliminary motion field, (2) calculating of an improved motion field by using individually for each pixel or block of pixels the hypothesis motion field and the estimated motion field taking into account the first image, the first shape, the second image and the second shape.

7. The method according to claim 6, further comprising the step of:

(3) filtering the improved motion field using an adaptive filtering technique, whose low pass character varies locally with the degree of confidence which can be obtained by the gradient of the first image.

8. The method according to claim 7, wherein in step (3) the vertical filtering depends only on the vertical component of the gradient, and the horizontal filtering depends only on the horizontal component of the gradient, and/or wherein the intensity gradient is calculated and the low pass character of the filter is weaker along the gradient and stronger perpendicular to the gradient.

9. The method according to claim 8, the method comprising the steps:

(1) calculating a gradient vector field of the first image and taking the absolute values of the components, producing a vertical and a horizontal component field, (2) applying a monotone transformation to the vertical component field in the way that the maximum value is mapped to zero and zero values are mapped to a given maximum filter range, producing a transformed vertical component field, or applying a monotone transformation to the vertical component field in the way that values above the minimum between the maximum value and a given number are mapped to zero and zero values are mapped to a given maximum filter range, producing a transformed vertical component field, (3) treat the horizontal component field analogous to step (2), producing a transformed horizontal component field, (4) applying a filter operation to each of the transformed vertical and horizontal component fields so that each value is decreased as long as the difference to one of its neighbors is bigger than one, thereby producing a vertical and a horizontal strength image for low pass filtering.

(5) filtering the motion field according to the vertical and horizontal strength images for low pass filtering.

10. The method according to claim 7, wherein in step (3) the degree of confidence is found by measuring how strong the displaced frame difference depends on a change of the motion field.

11. The method according to claim 7, wherein the gradients of the motion field components are taken into account for calculating the degree of confidence.

12. The method according to claim 6, wherein step (1) of claim 6 comprises a method for estimating a motion field from a first image with a corresponding first shape to a second image with a corresponding second shape, wherein a preliminary motion field is given, the motion fields having one motion vector for each valid pixel or valid block of pixels in the first image, the method comprising the steps:

(1) forward warping of the first image and the first shape according to the preliminary motion field, producing predictions for the second image and second shape, (2) estimating motion from the predictions to the second image and the second shape, producing an offset difference motion field, (3) backward warping of the offset difference motion field and of the prediction of the second shape using the preliminary motion field, producing a difference motion field and a corresponding difference motion shape, (4) extrapolating each motion vector of the difference motion field on the first shape not common with the difference motion shape from the nearest neighbors given on the difference motion shape, (5) adding the difference motion field to the preliminary motion field, thereby producing the final motion field.

13. The method according to claim 6, wherein step (1) of claim 6 comprises a method for estimating a motion field from a first image with a corresponding first shape to a second image with a corresponding second shape, wherein a preliminary motion field is given, the motion fields having one motion vector for each valid pixel or valid block of pixels in the first image, the method comprising the steps:

(1) backward warping of the second image and of the second shape according to the preliminary motion field, producing predictions for the first image and the first shape.

(2) estimating motion from the first image and the first shape to the predictions, producing a difference motion field, (3) adding the difference motion field to the preliminary motion field, thereby producing the final motion field.

14. The method according to claim 6, wherein step (2) of claim 6 comprises a method for estimating a motion field from a first image and a first shape to a second image and a second shape, wherein a first and a second preliminary motion field are given, the method combining the preliminary motion fields to produce an improved motion field, the method comprising the steps:

(1) forward warping of the first image and the first shape using the first preliminary motion field, producing first predictions of the second image and the second shape, (2) calculating a first residual as the difference, for each pixel or block of pixels, between the second image and the first prediction of the second image taking into account the second shape and the first prediction of the second shape, associating the difference with each pixel or block of pixels in the first image by warping the difference back using the first preliminary motion field, (3) forward warping of the first image and the first shape using the second preliminary motion field, producing second predictions of the second image and the second shape, (4) calculating a second residual as the difference, for each pixel or block of pixels, between the second image and the second prediction of the second image taking into account the second shape and the second prediction of the second shape, associating the difference with each pixel or block of pixels in the first image by warping the difference back using the second preliminary motion field, (5) computing a choice field having one choice value for each pixel or block of pixels in the first image by comparing the corresponding pixel or block of pixels of the first and second residual, the choice value indicating which of the two residuals is smaller, (6) composing a final motion field, taking motion vectors from the first motion field or second motion field based on the choice field.

15. The method according to claim 6, wherein step (2) of claim 6 comprises a method for estimating a motion field from a first image and a first shape to a second image and a second shape, wherein a first and a second preliminary motion field are given, the method combining the preliminary motion fields to produce an improved motion field, the method comprising the steps:

(1) backward warping of the second image and the second shape using the first preliminary motion field, producing first predictions of the first image and the first shape, (2) calculating a first residual as the difference, for each pixel or block of pixels, between the first image and the first prediction of the first image taking into account the first shape and the first prediction of the first shape, (3) backward warping of the second image and the second shape using the second preliminary motion field, producing second predictions of the first image and the first shape, (4) calculating a second residual as the difference, for each pixel or block of pixels, between the first image and the second prediction of the first image taking into account the first shape and the second prediction of the first shape, (5) computing a choice field having one choice value for each pixel or block of pixels in the first image by comparing the corresponding pixel or block of pixels of the first and second residual, the choice value indicating which of the two residuals is smaller, (6) composing a final motion field, taking motion vectors from the first motion field or second motion field based on the choice field.

16. The method according to claim 14, the method comprising the additional step:

(5b) median filtering the choice field.

17. The method according to claim 14, wherein more than two preliminary motion fields are given, steps (1) and (2), respectively (3) and (4), are repeated for each preliminary motion field, and step (5) is extended to more than two residuals.

18. The method according to claim 14, the method comprising the additional step:

(5c) replacing every value in the choice field, with a new value which minimizes a cost function.

19. The method according to claim 18, wherein the cost function is given by a weighted sum of the residual values and the corresponding roughness values of the choice field.

20. The method according to claim 14, wherein the residuals are filtered using a low-pass filter prior to step (5) of claim 15.

21. The method according to claim 14, wherein the residuals are given relative to how noticeable they are for the human visual system under consideration of masking effects.

22. A method for estimating a motion field from a first image with a corresponding first shape to a second image with a corresponding second shape, wherein a hypothesis motion field is given, the motion fields having one motion vector for each valid pixel or valid block of pixels in the first image, the method comprising the steps:
(1) forward warping of the first image and the first shape according to the hypothesis motion field, producing predictions for the second image and second shape,
(2) estimating motion from the predictions to the second image and the second shape using a method according to claim 1, producing an offset difference motion field,
(3) backward warping of the offset difference motion field and of the prediction of the second shape using the hypothesis motion field, producing a difference motion field and a corresponding difference motion shape,
(4) extrapolating each motion vector of the difference motion field on the first shape not common with the difference motion shape from the nearest neighbors given on the difference motion shape,
(5) adding the difference motion field to the hypothesis motion field, thereby producing the final motion field.

23. A method for estimating a motion field from a first image with a corresponding first shape to a second image with a corresponding second shape, wherein a hypothesis motion field is given, the motion fields having one motion vector for each valid pixel or valid block of pixels in the first image, the method comprising the steps:
(1) backward warping of the second image and of the second shape according to the hypothesis motion field, producing predictions for the first image and first shape,
(2) estimating motion from the first image and the first shape to the predictions using a method according to claim 1, producing a difference motion field,
(3) adding the difference motion field to the hypothesis motion field, thereby producing the final motion field.

24. The method according to claim 1, wherein the final motion field is replaced by that one of the given motion fields which leads to the best prediction.

25. The method according to claim 24, wherein in step (1) the hypothesis motion field is set to the motion field of the preceding estimation, or wherein in step (1) the hypothesis motion field is set to the sum of the motion field of the preceding estimation and the preceding change of motion, or wherein in step (1) the hypothesis motion field is set to the gum of the motion field of the preceding estimation and the weighted preceding change of motion.

26. A method for estimating motion within a sequence of related images with corresponding shapes, wherein motion estimation is performed from a first image to subsequent target images, the method comprising the steps:
(1) calculating a hypothesis motion field from the former estimated motion fields,
(2) estimating the final motion field from the first image to the current target image using a method according to claim 1, with the hypothesis motion field of step (1).

27. A method for estimating motion within a sequence of related images with corresponding shapes, wherein motion estimation is performed from a subsequent set of images to a target image, the method comprising the steps:
(1) calculating a scaled motion field by scaling the motion field of the preceding estimation with respect to the position of the images in the sequence,
(2) calculating a temporal motion field as the difference between the motion field of the preceding estimation and the scaled motion field,
(3) forward warping of the scaled motion field and the shape of the preceding image using the temporal motion field, thereby producing a hypothesis motion field and a hypothesis shape,
(4) extrapolating each motion vector of the hypothesis motion field on the shape of the current image not common with the hypothesis shape from the nearest neighbors given on the hypothesis shape,
(5) estimating the final motion field from the current image to the target image using a method according to claim 1, with the hypothesis motion field.

28. A method for estimating motion within a sequence of related images with corresponding shapes, wherein motion estimation is performed from a subsequent set of images to a target image, the method comprising the steps:
(1) backward warping of the target image ad the target shape with the motion field of the preceding estimation, producing temporal predictions for the current image and shape,
(2) estimating motion from the current image and shape to the temporal predictions by a method according to claim 1, producing a difference motion field,
(3) backward warping of the motion field of the preceding estimation and the corresponding shape with the difference motion field, producing a temporal motion field and a temporal shape,
(4) extrapolating each motion vector of the temporal motion field on the current shape not common with the temporal shape from the nearest neighbors given on the temporal shape,
(5) adding the difference motion field to the temporal motion field, thereby producing the final motion field.

29. A method for estimating a motion field from a first image with a corresponding first shape to a second image with a corresponding second shape, wherein a hypothesis motion field may be given, the motion fields having one motion vector for each valid pixel or valid block of pixels in the first image, the method comprising the steps:
(1) estimating a temporal motion field by a method according to claim 1,
(2) forward warping of the first image and the first shape according to the temporal motion field, producing predictions for the second image and second shape,
(3) estimating motion from the predictions to the second image and the second shape, producing an offset difference motion field,
(4) backward warping of the offset difference motion field and the prediction of the second shape using the temporal motion field, producing a difference motion field and a corresponding difference motion shape,
(5) extrapolating each motion vector of the difference motion field on the first shape not common with the difference motion shape from the nearest neighbors given on the difference motion shape,
(6) adding the difference motion field to the temporal motion field, thereby producing the final motion field.

30. A method for estimating a motion field from a first image with a corresponding first shape to a second image with a corresponding second shape, wherein a hypothesis motion field may be given, the motion fields having one motion vector for each valid pixel or valid block of pixels in the first image, the method comprising the steps:
(1) estimating a temporal motion field by a method according to claim 1,
(2) backward warping of the second image and of the second shape according to the temporal motion field, producing predictions for the first image and first shape, (3) estimating motion from the first image and the first shape to the predictions, producing a difference motion field, (4) adding the difference motion field to the temporal motion field, thereby producing the final motion field.

31. The method according to claim 1, wherein some methods or steps are applied in an iterative manner controlled by a control module.

32. An apparatus for estimating a motion field from a first image with a corresponding first shape to a second image with a corresponding second shape, wherein a hypothesis motion field is given, the motion fields having one motion vector for each valid pixel or valid block of pixels in the first image, the apparatus comprising:

(1) means for successive low pass filtering and sub sampling of the first image, the first corresponding shape, the second image, the second corresponding shape and the hypothesis motion field, until a given coarsest resolution level is reached, thereby producing multi resolution representations, (2) means for setting a preliminary motion field on the coarsest resolution level equal to the coarsest hypothesis motion field, (3) means for estimating a motion field on the coarsest resolution level from the first image to the second image by taking into account the first image, the first shape, the second image, the second shape, the preliminary motion field and the hypothesis motion field, and staring the following steps with the coarsest resolution level, (4) means for propagating and expanding the estimated motion field of the current coarse resolution level, producing a preliminary motion field for the next finer resolution level by taking into account the estimated motion field and the first shape of the coarse resolution level, the first image, the first shape and the second shape of the finer resolution level, (5) means for estimating a motion field on the finer resolution level from the first image to the second image producing an estimated motion field for the finer resolution level by taking into account the first image, the first shape, the second image, the second shape, the preliminary motion field and by using the hypothesis motion field, said hypothesis motion field being used to improve the estimated motion field, all on the finer resolution level, (6) means for identifying the new coarse resolution level with the old finer resolution level and repeatedly applying said propagating means (4) and said estimating means (5) until the finest resolution level is reached.

33. A Computer program product comprising:

a computer-usable medium having computer-readable program code means embodied therein for causing said computer to estimate a motion field from a first image with a corresponding first shape to a second image with a corresponding second shape, wherein a hypothesis motion field is given, the motion fields having one motion vector for each valid pixel or valid block of pixels in the first image, the computer program product comprising:

(1) computer-readable program code means for causing a computer to successively low pass filter and sub sample the first image, the first corresponding shape, the second image, the second corresponding shape and the hypothesis motion field, until a given coarsest resolution level is reached, thereby producing multi resolution representations, (2) computer-readable program code means for causing a computer to set a preliminary motion field on the coarsest resolution level equal to the coarsest hypothesis motion field, (3) computer-readable program code means for causing a computer to estimate a motion field on the coarsest resolution level from the first image to the second image by taking into account the first image, the first shape, the second image, the second shape, the preliminary motion field and the hypothesis motion field, and starting the following steps with the coarsest resolution level, (4) computer-readable program code means for causing a computer to propagate and expand the estimated motion field of the current coarse resolution level, producing a preliminary motion field for the next finer resolution level by taking into account the estimated motion field and the first shape of the coarse resolution level, the first image, the first shape and the second shape of the finer resolution level, (5) computer-readable program code means for causing a computer to estimate a motion field on the finer resolution level from the first image to the second image producing an estimated motion field for the finer resolution level by taking into account the first image, the first shape, the second image, the second shape, the preliminary motion field and by using the hypothesis motion field, said hypothesis motion field being used to improve the estimated motion field, all on the finer resolution level, (6) computer-readable program code means for causing a computer to identify the new coarse resolution level with the old finer resolution level and repeat steps (4) and (5) until the finest resolution level is reached.

* * * * *